United States Patent [19]

Emori et al.

[11] Patent Number: 4,893,201
[45] Date of Patent: Jan. 9, 1990

[54] TRACK ACCESS CONTROL SYSTEM FOR MAGNETIC DISK APPARATUS

[75] Inventors: Teruaki Emori; Hiroyuki Mase, both of Kawasaki; Ikuo Kitamura, Fujisawa, all of Japan

[73] Assignee: Fujitsu Limited, Kawasaki, Japan

[21] Appl. No.: 202,673

[22] Filed: Jun. 6, 1988

[30] Foreign Application Priority Data

Jun. 6, 1987 [JP] Japan .................................. 62-140752

[51] Int. Cl.$^4$ ........................ G11B 5/02; G11B 5/596; G11B 21/08
[52] U.S. Cl. ............................... 360/77.04; 360/78.04
[58] Field of Search ............. 360/39, 51, 77.02, 77.04, 360/78.04

[56] References Cited

U.S. PATENT DOCUMENTS

| | | | |
|---|---|---|---|
| 3,812,533 | 5/1974 | Kitamura et al. | 360/77.08 |
| 4,136,365 | 1/1979 | Chick et al. | 360/78.05 |
| 4,697,213 | 9/1987 | Kitamura | 360/77.02 |
| 4,825,309 | 4/1989 | Shoji et al. | 360/78.13 X |
| 4,827,362 | 5/1989 | Baba | 360/77.04 |

FOREIGN PATENT DOCUMENTS

| | | |
|---|---|---|
| 0238318 | 9/1987 | European Pat. Off. . |
| 2730394 | 2/1978 | Fed. Rep. of Germany . |
| 49-117007 | 11/1974 | Japan . |

OTHER PUBLICATIONS

European Search Report EP 88 30 5094 by Examiner Chaumeron B. in Berlin on Feb. 21, 1989.
"Correction of Data Track Misregistration in Servo Controlled Disk Files", *IBM Technical Disclosure Bulletin*, Nov., 1974, pp. 1781–1783, vol. 17, No. 6.

Primary Examiner—Alan Faber
Assistant Examiner—David L. Robertson
Attorney, Agent, or Firm—Staas & Halsey

[57] ABSTRACT

An improved track access control system for a magnetic disk apparatus connectable to a variety of host controllers without any change thereto, and capable of an offset correction. A control unit in the disk apparatus controlling a moving unit to access a magnetic head at a desired track on the magnetic disk in response to a seek command from a host controller and using an offset correction value which is previously obtained by accessing the magnetic head at a track storing the fine positioning information, and carrying out an offset correction, includes a timer to which a time to be offset-updated within a predetermined timing is set. The control unit makes an offset correction value invalid in response to the time out of the timer, and when a seek command from the host controller in response to the offset invalidity is issued within a predetermined time, the control unit carries out an offset correction in response to the seek command, and executes the seek command, or inhibits an output of an index signal, carries out an offset correction at a previously given track from the host controller, and thereafter, permits an output of the index signal. The control unit sets the time for updating the offset correction to the timer.

10 Claims, 23 Drawing Sheets

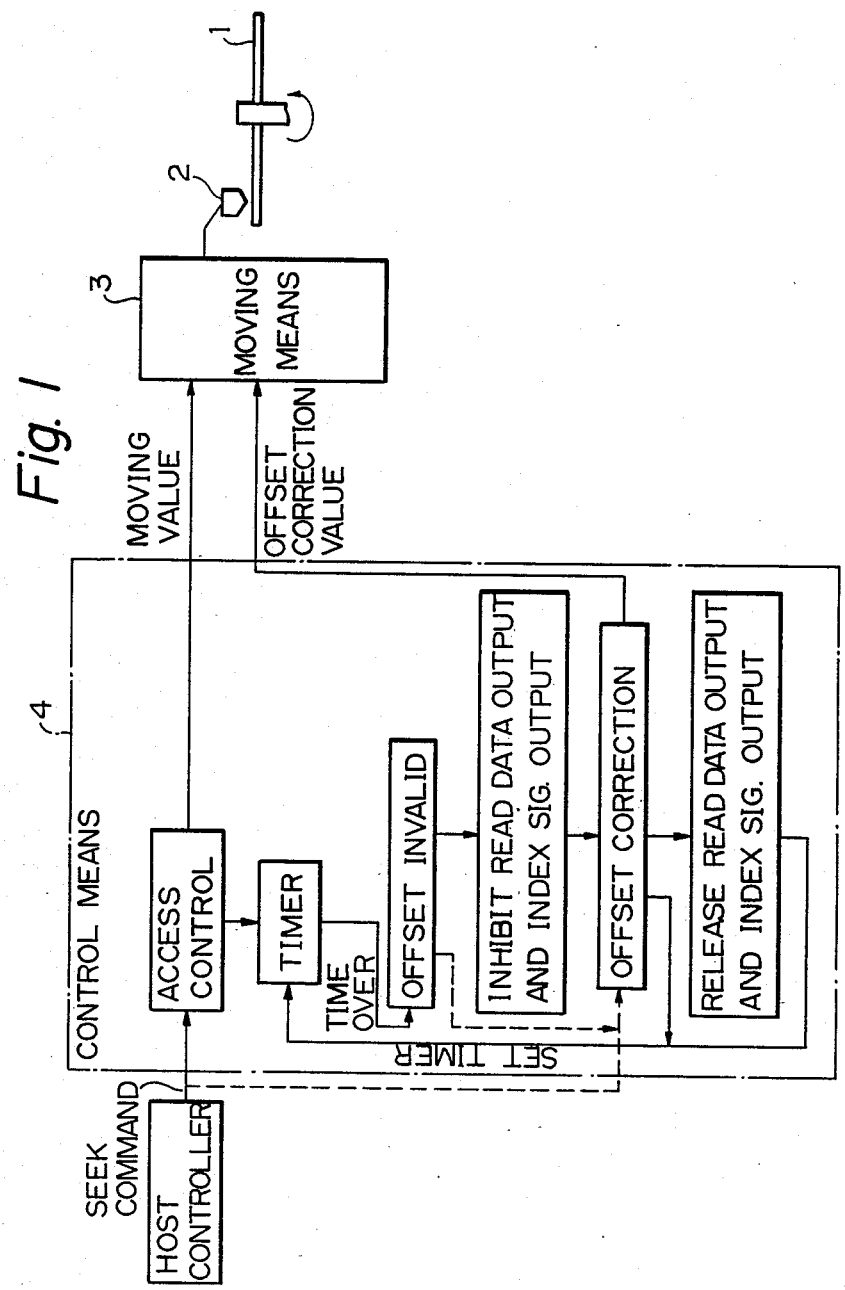

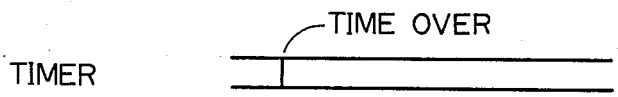
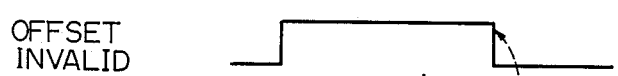
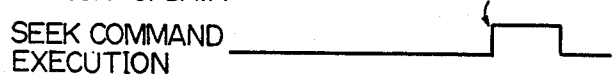
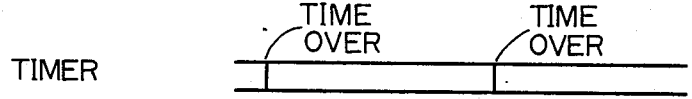
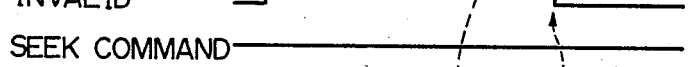
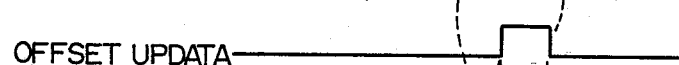
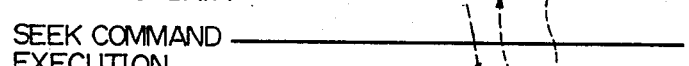
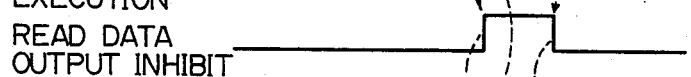

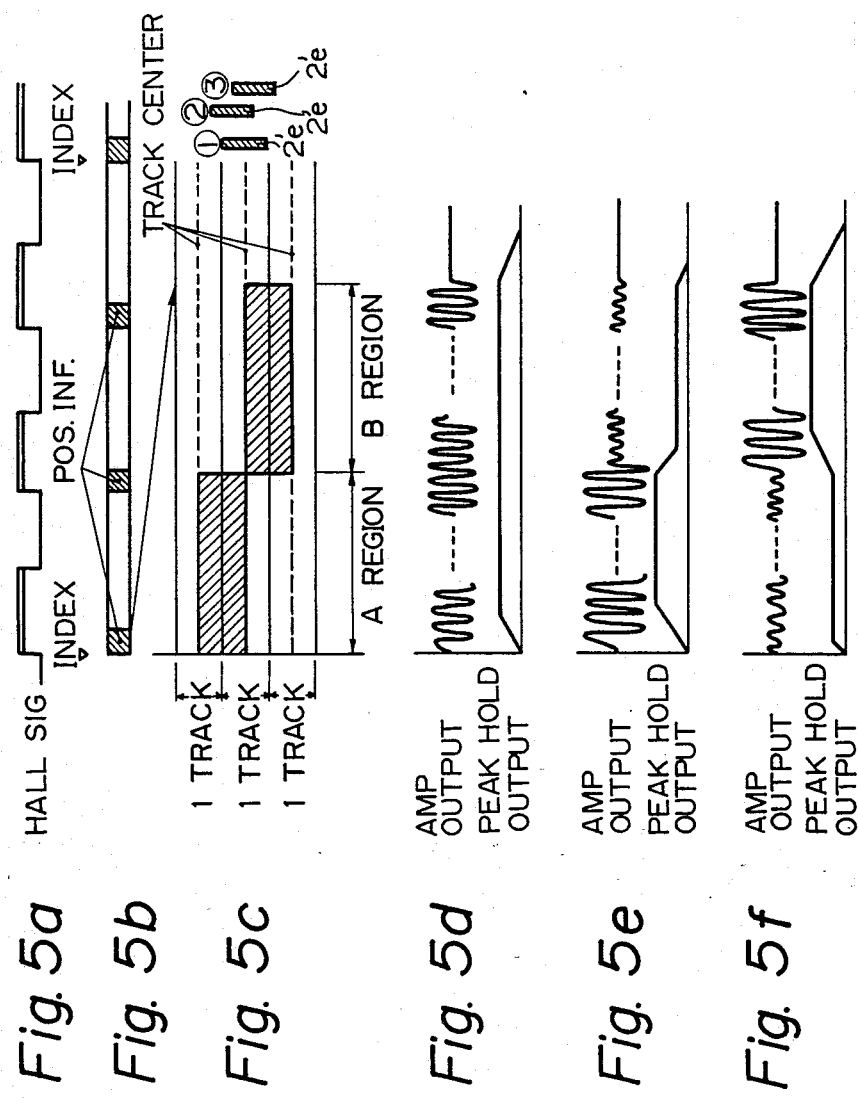

TRACK ACCESS CONTROL SYSTEM FOR MAGNETIC DISK APPARATUS

BACKGROUND OF THE INVENTION

1. Field of the Invention

The present invention relates to a magnetic disk apparatus in a computer system, more particularly, to a track access control system for a magnetic disk apparatus wherein a magnetic disk is provided with data tracks and servo tracks and the amount of offset obtained from the servo tracks is used as the amount of correction for accessing the data tracks.

Further, the present invention relates to a magnetic disk apparatus which uses a positioning system based on an open loop system typically used for stepping motors or an open loop system combining a DC torque motor and encoder, and which uses a so-called comparative track servo system based on a semiclosed loop system wherein the servo position information recorded on the data surface is used as feedback control information.

2. Description of the Related Art

The track pitch on the disks of rotary disk memory devices such as magnetic disk apparatuses, etc., has recently become much smaller due to the demands for a higher density and larger capacity data storage. In such disk apparatuses, the small track pitch means that deviations in the track position caused by an imprecise mounting of the magnetic head or elongation or contraction of the disk etc., due to temperature rises can no longer be ignored, and thus a need has arisen for the detection of the deviations in position and correction of the same.

Therefore, magnetic disks are now provided with not only data tracks, but also servo tracks, on part of which is written servo positioning information. The magnetic head is positioned at the servo tracks and the content of the servo tracks read out by the magnetic head and deviations in position of the magnetic head vis-a-vis the servo tracks are detected by the read output. This is used as the amount of offset and as the amount of correction in the later accessing by the head of the data tracks.

On the other hand, there is a need for updating the amount of offset, since the deviations in position change along with temperature.

One method for updating the offset is to access the servo tracks periodically, measure the amount of offset, and then update the same. The offset update, however, is performed asynchronously with the host controller, and if the offset update operation is being performed while the host controller is giving a seek command, this command could not be accepted. Therefore, the host controller must monitor offset update operations of the disk apparatus while issuing commands.

Various track access control system for disk apparatuses able to perform the above-mentioned offset update without obstructing the issuance of commands by the host controller have been proposed.

On the other hand, various positioning systems for magnetic disk apparatuses have been proposed, among which are known (a) a semiclosed loop system wherein use is made of a stepping motor, open loop control is adopted, and the positional information recorded on the data surface of the magnetic disk is fed back, and, (b) another semiclosed loop system wherein a DC torque motor and encoder are combined, open loop control is adopted, and, in the same way as above, positional data is fed back.

Generally, there are index servo systems which use indexes as positional information and comparative track servo systems which use the offset of the servo track.

The comparative track servo system operates on the basic principle of seeking the servo tracks to be compared near the target cylinder, synchronously with a seek command from the host controller or disk controller, and reading the servo information written there, using the read servo information for fine adjustment, and simultaneously seeking the target cylinder and positioning there. Here the amount of offset is updated just before the positioning to the target cylinder. But in this system, if a seek command is not issued by the host controller for a long time, servo information is not read out and thus the amount of offset is not updated. Therefore, if temperature changes occurred in the mechanical components during that time, the problem of off-tracking due to heat expansion would still exist.

One method of preventing this offset was disclosed by the assignee in JPA62-162546, entitled "Track Access Control System for Disk Apparatus". This system made use of the fact that a track seek command is issued when the host controller encounters a read error. That is, a timer is provided in the magnetic disk apparatus side and if no seek command arrives after a set period of time, the timer runs out, the amount of offset is made invalid, and a read error is compulsorily generated. The host controller then issues a retry seek command in response to the read error, and the magnetic disk apparatus then updates the amount of offset in accordance with the retry seek command.

It is important to note that the magnetic disk apparatus performing the above processing has great value as an OEM product and can be connected to various types of host controllers; in other words, it has an interface which enables it to be used in various systems. Also, when performing the above-mentioned processing, the existing processing content of the host controller is not changed.

The above method, i.e., the method which compulsorily causes a generation of a read error, cannot be used as is for a host controller which does not issue a retry seek command even if a read error is generated. In general, as mentioned earlier, the host controller has a retry seek command issuing function, but sometimes it is desirable to connect the magnetic disk apparatus to a host controller not having such a function, and to connect the above-mentioned magnetic disk apparatus to such a host controller, it is necessary to change the firmware of the host controller. Such a change of the firmware would entail a great deal of trouble and, further, as mentioned above, would go against the principle that this magnetic disk apparatus is able to be connected without change to the host controller to which it is to be connected. Further, since read errors are recorded as statistical information, they would be treated as breakdowns. Therefore, from this standpoint too, it would become necessary to change the firmware of the host controller not having the above function. As mentioned above, changing the firmware would place a burden on the host controller side and would reduce the range of application of the magnetic disk apparatus.

Another method is to read the servo information of the comparative track when the select signal from the host controller is off, perform the update on the offset for correction of positioning, and then return the magnetic head to the original cylinder.

In this method, the host controller has a function of turning the select signal off. Also, changes in the firmware would be necessary. In particular, when only one magnetic disk apparatus is connected, it is often continually accessed and the select signal is not turned off. This being the case, problems similar to the above occur, i.e., there is no chance for correction of the offset in this method.

SUMMARY OF THE INVENTION

The present invention has as its object the provision of a magnetic disk apparatus which can be connected to a variety of host controllers without forcing a burden on the host controller or forcing a change of the firmware and, further, which can effectively correct the offset.

According to the present invention, there is provided a track access control system for a magnetic disk apparatus including a rotatable magnetic disk provided with fine positioning information, a magnetic head, a unit for moving said magnetic head in a direction in which it intersects tracks on the magnetic disk, and a control unit for controlling the moving unit to access the magnetic head at a desired track on the magnetic disk in response to a seek command from a host controller and by using an offset correction value which is previously obtained by accessing the magnetic head at a track storing the fine positioning information, and carrying out an offset correction. The control unit comprises a timer to which a time to be offset-updated at a predetermined timing is set. The control unit makes the offset correction value invalid in response to the time out of the timer, and when a seek command from the host controller in response to the offset invalid is issued within a predetermined time, the control unit carries out an offset correction in response to the seek command, and executes the seek command. Or when a seek command from the host controller in response to the offset invalid is not issued within a predetermined time, the control unit inhibits an output of an index signal of the magnetic disk, carries out an offset correction to a previously given track from the host controller, and thereafter, permits an output of said index signal. The control unit sets the time for updating the offset correction to the timer.

The control unit may inhibit an output of read data to said host controller when the output of said index signal is inhibited.

The control unit may comprise a circuit for generating dummy data, and the control unit outputs the dummy data from the dummy data generation circuit to the host controller when the output of the index signal is inhibited.

The control unit may set a time defined as a duration when a predetermined offset is produced at the timer as the offset update time.

BRIEF DESCRIPTION OF THE DRAWINGS

The present invention will now be described in further detail with reference to the appended figures, in which:

FIG. 1 is a block diagram of a track control system of a magnetic disk apparatus of the present invention;

FIGS. 2a to 2e and FIG. 3a to 3g are operational timing charts of the control system of FIG. 1;

FIGS. 5a to 5f are explanatory views of the servo tracks of FIGS. 4a to 4c;

DESCRIPTION OF THE PREFERRED EMBODIMENTS

Figure 4A:
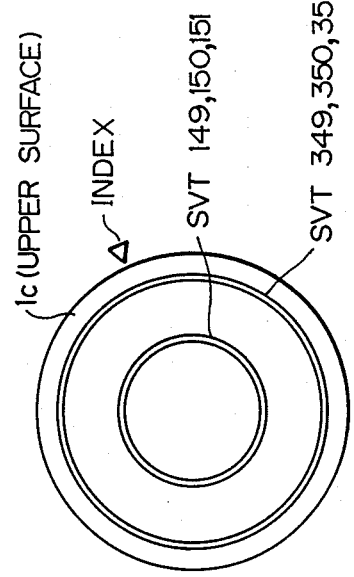
FIGS. 4a to 4c are explanatory views of the magnetic disk mechanism of an embodiment of the present invention.

To assist in understanding the preferred embodiments, the basic concept of the present invention will first discussed.

FIG. 1 is a block diagram of a track control system of a magnetic disk apparatus of the present invention.

In the figure, reference numeral 1 is a rotating magnetic disk which has a plurality of tracks in its radial direction and which is provided with servo tracks, at part of the outside tracks of the data track, on which is written servo information as precision positioning information. Reference numeral 2 is a magnetic head, which reads and writes the contents of the tracks of the magnetic disk 1. Reference numeral 3 is a moving means, which moves the access of the magnetic head 2 in the direction intersecting the tracks of the magnetic disk 1, i.e., the radial direction of the magnetic disk. Reference numeral 4 is a control means, which controls the moving means 3 so as to access the magnetic head 2 to a designated track in accordance with a seek command from a host controller and which, by offset measurement and update processing, accesses the magnetic head 2 to the servo tracks, measures the offset amount, and uses the offset amount as the amount of correction at the time of the afore-mentioned track access.

The control means 4 is provided with a timer which manages the offset correction timing. When the time runs out, the offset amount is made invalid, a seek command is made to be output from the host controller having an error retry function, and the update of the offset correction is promoted. On the other hand, when the control means 4 invalidates the offset amount after the time runs out and, if it does not receive a seek command within a certain amount of time, it inhibits the output of the read output and index signal of the magnetic disk, performs the offset correction automatically, and again enables output of the read output and index signal.

In general, the host controller uses the index from the control means to count a timer therein. Therefore, an inhibition of the output of the index from the control means does not cause a time over in the host controller after the seek command is issued therefrom. As a result, the host controller does not need to process a troublesome operation during the offset correction of the control means.

In addition, inhibiting the output, of the read data does not require a further seek command to be issued for a retry, and thus the host controller does not issue a further retry command with the seek command.

Conversely, when the disk control apparatus of the present invention is used with host controllers which issue a retry command with a seek command, dummy read data can be output from the disk control apparatus to the host controller. In this case, of course, the index signal is not output from the disk control apparatus.

In the present invention, as shown in FIGS. 2a to 2e, in the case of a host controller having an error retry function, when the timer runs out, the control means 4 makes the offset amount invalid and the control means 4 measures and updates the offset correction amount when it receives a seek command output from the host controller with respect to the offset invalidation and then executes the seek command. That is, in this case, the time when an offset amount is necessary is when a seek command is given from the host controller. When no seek command is given, no offset amount is required. Therefore, it is only necessary to perform measurement and updating of the offset when receiving a seek command. This enables the host controller to issue a command without having to worry about the offset measurement and updating. This in turn means that offset measurement and updating are synchronized with the host controller.

On the other hand, as shown in FIGS. 3a to 3g, after the time has run out, if there is no seek command for a predetermined time (until the next time period of the timer runs out) even if the offset is invalid, that is, in the state where the magnetic head is still positioned at the same track address or the case where a host controller not having an error retry function is connected, the amount of offset will change from the previous one after the next time period runs out and the track and magnetic head will be deviated in position from each other. Therefore, even if a read/write command without an accompanying seek command is received and executed, the offset correction would not be suitable, so a correct read/write operation on the track would not be possible. Therefore, output of the read output from the magnetic head to the host controller and output of the magnetic disk index signal are inhibited and offset correction performed autonomously. After this, the inhibition on the read output and the index signal output is released.

In the case of both FIGS. 2a to 2e and FIGS. 3a to 3g, the timer is again set to an offset update time and, when the time runs out, the above-mentioned processing is executed.

The preferred embodiments of the invention will now be described.

(a) Explanation of Magnetic Disk Mechanical Components

Figure 4B:
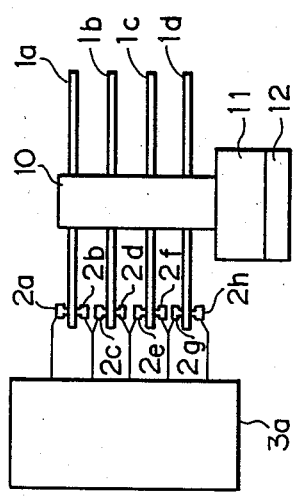
Figure 4C:
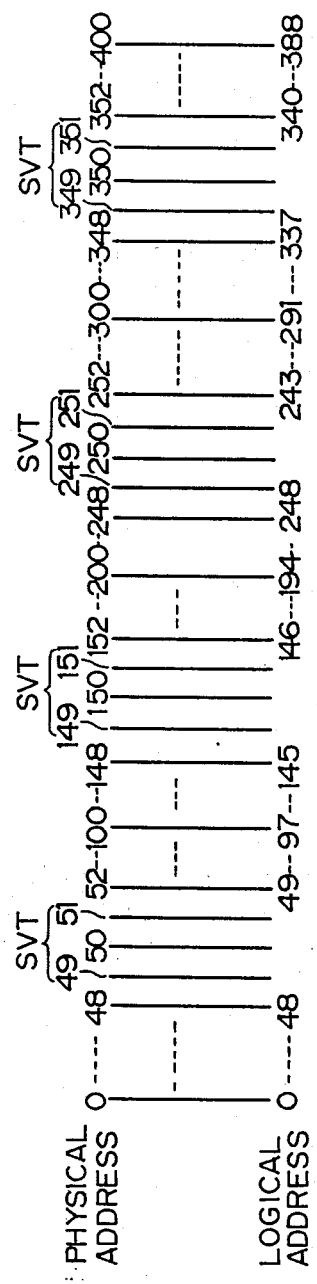

FIGS. 4a to 4c are explanatory views of the magnetic disk mechanism.

In FIG. 4a, reference numerals 1a, 1b, 1c, and 1d show magnetic disks. The magnetic disks are provided with magnetic recording films on both sides. In this example, the top surface of the magnetic disk 1c, as shown in the representative example of FIG. 4b, has servo tracks SVT mixed with the data tracks (tracks other than servo tracks SVT, not illustrated). The two sides of the other disks 1a, 1b, and 1d and the bottom surface of the disk 1c have only data tracks. Reference numeral 11 shows a spindle motor, which turns the magnetic disks 1a, 1b, 1c, and 1d mounted on the rotary shaft 10. Reference numeral 12 shows a servo position detection mechanism which is connected to the spindle motor 11 and issues a Hall signal corresponding to the write position of the positioning information of the servo tracks SVT. Reference numerals 2a, 2b, 2c, 2d, 2e, 2f, 2g, and 2h show magnetic heads which perform the read/write operations on the magnetic disks 1a to 1d. Reference numeral 3a shows a voice coil motor (VCM) which supports the magnetic heads 2a to 2h via leaf springs and move the same in the radial direction of the magnetic disks 1a to 1d.

Therefore, the magnetic disks 1a to 1d are turned by the spindle motor 11 and the magnetic heads 2a to 2h are moved in the radial direction of the magnetic disks 1a to 1d by the VCM 3a for the access to the desired track.

The tracks are arranged on the top surface of the magnetic disk 1c, as shown in FIG. 4c, with, for example, tracks 0 to 400 set physically in the radial direction, 100 tracks constituting one zone and servo tracks SVT, consisting of three tracks being set in the middle of each zone.

In this example, the physical track addresses "49", "50", "51", "149", "150", "151", "249", "250", "251", "349", "350", and "351" are servo tracks SVT. The others are data tracks. On the other hand, logical track addresses are allocated successively to the data tracks, i.e., track other than the servo tracks SVT, in order from the left of FIG. 4c. For example, the physical track address "400" corresponds to "388" in the logical track address. In each zone, use is made of the offset amount obtained from the servo tracks of the zone as the correction amount.

That is, the offset correction is performed for each zone.

FIGS. 5a to 5f are explanatory views of a servo track.

As shown in FIGS. 5a and 5b, the servo tracks SVT have written therein three pieces of positioning information for each turn spaced at predetermined intervals starting from the index, which serves as the reference position, illustrated in FIG. 4b. The servo position detection mechanism 12 outputs a Hall signal corresponding to the rotation of the spindle motor.

The servo tracks SVT three tracks as shown in FIG. 5c. The positioning information written on the three tracks, each track being shown by hatching, comprises signals written on the bottom half of the top track and the top half of the center track shown in the figure in region A, for a total of one track, and the bottom half of the center track and the top half of the bottom track in the figure in region B, for a total of one track. Therefore, when positioning the magnetic head 2e aiming at the center of the three servo tracks, if positioned at the center track of the servo tracks shown in [1] of FIG. 5c, the head output derived through the amplifier will be the same as the output of the region A and region B as in FIG. 5d. Thus, the peak hold outputs of the region A and region B become the same in level and the difference in the peak outputs of the region A and region B, i.e., the offset, becomes zero. On the other hand, when the magnetic head 2e is positioned above the center track of the servo tracks shown in [2] of FIG. 5c, the head output derived through the amplifier becomes as shown in FIG. 5e, with the region A larger and the region B smaller, so the peak hold output of the region A becomes larger than that of the region B. Therefore, the difference in peak outputs of the region A and region B becomes a positive value and a positive offset amount if obtained. Conversely, when the magnetic head 2e is positioned below the center track of the servo tracks shown in [3] of FIG. 5c, the head output derived through the amplifier becomes as shown in FIG. 5f, with the region A smaller and the region B larger, so the peak hold output of the region A becomes smaller than that of the region B. Therefore, the difference between the peak outputs of the region A and region B becomes a negative value and a negative offset amount is obtained.

The amount of offset is proportional to the distance of the center track from the center, so that offset amount can be obtained by positioning the head aiming at the center track of the servo tracks, reading the positioning information in synchronization with the Hall signal, and taking the difference.

(b) Explanation of Structure of Control Means

Figure 6A:
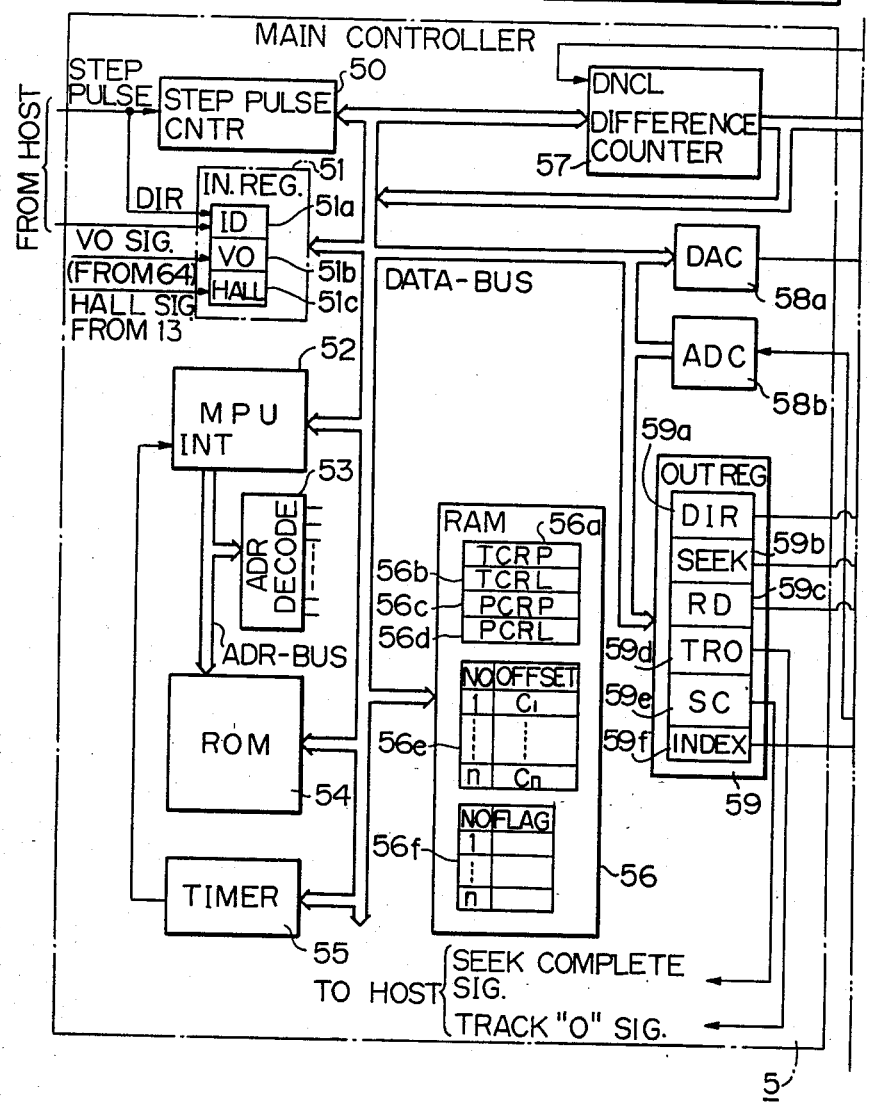
FIGS. 6A and 6B are structural views of an embodiment of the control means in accordance with the present invention.
Figure 6B:
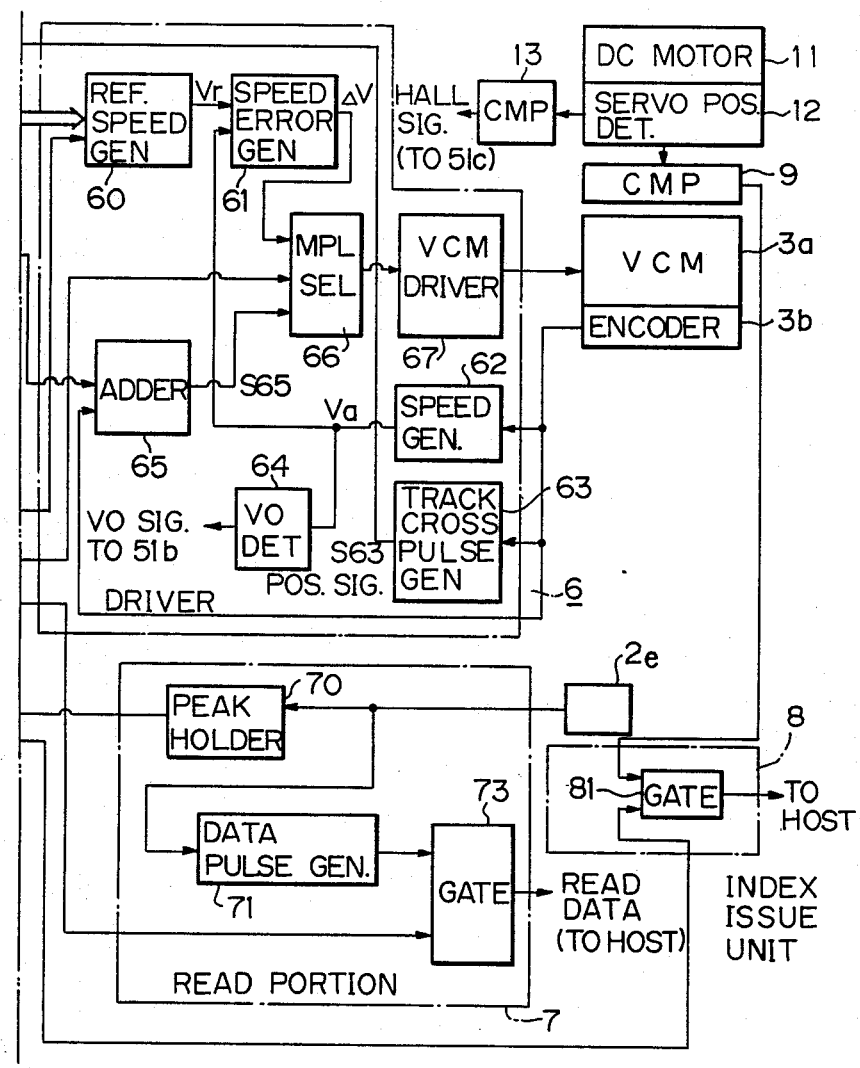

FIGS. 6A and 6B are structural views of the control means of one embodiment of the present invention.

In the figures, portions the same as those shown in FIGS. 4a to 4c are shown by the same reference symbols. Reference numeral 3b shows an encoder, which generates a sinusoidal 2-phase position signal in accordance with the movement of the VCM 3a. Reference numeral 13 shows a comparator, which converts into pulses the output of the servo position detection mechanical 12 and outputs the result as the Hall signal. Reference numeral 5 shows a main control unit, which executes the later mentioned initialization processing and access processing. Reference numeral 6 shows a drive unit, which performs positioning control on the VCM 3a by the amount of movement from the main controller 5 and the amount of offset. Reference numeral 7 shows a read portion, which gives the read output of the magnetic head 2e to the main controller 5 or the host controller.

Also provided are a comparator 9 for reading the index signal from the servo position detector 12 and an index transmitter 8 which transmits the index signal to the host controller.

The control means 4 is thus comprised of the main controller 5, the driver 6, the read portion 7, and the index transmitter 8.

The main controller 5 will now be explained in detail. Reference numeral 50 is a step pulse counter, which counts a number of step pulses corresponding to the logical relative address as the seek command from the disk controller of the host controller. Reference numeral 51 is an input register, which includes an ID latch 51a for latching the direction of movement from the disk controller of the host controller (not shown), a VO latch 51b for latching a VO signal showing that the speed of the VCM 3a of the VO speed detector, mentioned later, is zero, and a Hall latch 51c for latching the Hall signal (FIG. 5a) of the comparator 13. Reference numeral 52 is a microprocessing unit (MPU), which performs the later-mentioned initialization processing and access processing by execution of a program. Reference numeral 53 is an address decoder, which decodes the address from the MPU 52 and issues enable signals for registers described later, a digital to analog converter (DAC), and an analog to digital converter (ADC) and loads signals for the counter and timer. Reference numeral 54 is a read only memory (ROM), which stores the information required for the processing by the MPU 52, i.e., the initialization processing program, the access processing program, and other processing programs and the servo track physical track addresses and other parameters. Reference numeral 55 is the afore-mentioned timer TM, in which is loaded the timer value and which issues an interruption signal demanding interruption processing (offset correction and update processing) to the MPU 52 when the timer value becomes zero due to the counting of the clocks. Reference numeral 56 is a random access memory (RAM), which includes a target physical track address storage register (TCRP) 56a, a target logical track address storage register (TCRL) 56b, a present physical track address storage register (PCRP) 56c, a present logical track address storage register (PCRL) 56d, a correction storage register 56e for storing the amount of offset corrections $C_1$ to $C_n$ of the zones (1 to n), and a correction confirmation table 56f for storing flags for confirming if the offset correction amounts $C_1$ to $C_n$ of the correction storage register 56e are valid.

Reference numeral 57 is a difference counter, which is loaded with the number of tracks moved, i.e., the difference of the target physical track address and present physical track address, from the MPU 52. The value is decremented for updating by the track cross pulse by movement of the VCM 3a. Reference numeral 58a is a digital-analog converter (DAC), which is set with the offset correction value from the MPU 52 and which converts this to an analog value for output. Reference numeral 58b is an analog-digital converter ADC), which converts to a digital value the peak hold signal of the servo track read signal from the later-mentioned read portion 7 and supplies the same to the MPU 52.

Reference numeral 59 is an output register, which has a direction (DIR) latch 59a with a movement direction set by the MPU 52, a seek (SEEK) latch 59b with a state set to "seeking" by the MPU 52, a read (RD) latch 59c which is set to inhibit output of the read data from the magnetic head 2f of the read portion 7 by the MPU 52, a track zero (TRO) latch 59d which is set by the MPU 52 to show to the host controller that the head is at the track address "0", and a seek complete (SC) latch 59e which is set by the MPU 52 to show to the host controller that the seek operation is completed. In the present embodiment, there is further provided the later mentioned index (INDEX) register 59f.

ADR-BUS is an address bus and gives the address from the MPU 52 to the address decoder 53 and the ROM 54. DATA-BUS is a data bus, which sends and receives signals between the MPU 52 and the step pulse counter 50, input register 51, ROM 54, timer 55, RAM 56, difference counter 57, DAC 58a, ADC 58b, and output register 59.

Next, the driver 6 will be explained in detail. Reference numeral 60 is a target speed generator, which generates a target speed Vr having an amplitude proportional to the content of the difference counter 57, and having a polarity in response to the movement direction set by the direction latch 59a of the output register 59. Reference numeral 61 is a speed error detector, which calculates and outputs the error $\Delta V$ between the target speed Vr from the target speed generator 60 and the actual speed Va prepared by the later mentioned speed generator 62 by the encoder 3b of the VCM 3a. Reference numeral 62 is a speed generator 62, which integrates the position signal from the encoder 3b and generates the actual speed Va of the VCM 3a. Reference numeral 63 is a track cross pulse generator, which generates a track cross pulse S63 appearing with each crossing of the tracks from the positional signal from the encoder 3b and decrements (counts down) the abovementioned difference counter 57. Reference numeral 64 is a zero speed (VO) detector, which detects from the actual speed Va of the speed generator 62 that the actual speed of the VCM 3a has become zero, generates a zero speed signal VO, and gives the same to the VO latch 51b of the input register 51. Reference numeral 65 is an adder, which adds the offset correction amount from the DAC 58a and the positional signal from the encoder 3b to generate a positioning output S65. Reference numeral 66 is a multiplexer (MPX), which selects and outputs one of $\Delta V$ of the speed error detector 61 and the positioning output S65 of the adder 65 by the content of the seek latch 59b of the output register 59. When the seek latch 59b is set, $\Delta V$ is selected and output, and when it is reset, the positioning output S65 is selected and output. Reference numeral 67 is a VCM driver, which is comprised of a drive transistor (not shown) and drives the VCM 3a by the output $\Delta V$ or S65 from the multiplexer 66.

The read portion 7 will now be explained in detail.

Reference numeral 70 is a peak hold circuit, which performs a peak hold operation on the read output of the magnetic head 2e and outputs the result to the ADC 58b. This is used in the offset detection explained with reference to FIGS. 5a to 5f. Reference numeral 71 is a data pulse generator, which prepares data pulses from the read output of the magnetic head 2e. Reference numeral 73 is a gate circuit, which outputs to the host controller the data pulses of the data pulse generator 71 in accordance with the content of the RD latch 59c of the output register 59, inhibits the output when the RD latch 59c is set and outputs the data pulses to the host controller when the RD latch 59c is reset.

The index transmitter 8 has a gate circuit 81 and transmits to the host controller or inhibits an index signal from the comparator 9 in accordance with the content of the index latch 59f of the output register 59.

Explaining the operation under normal conditions, the main controller 5 receives the step pulse and direction as seek commands from the host controller and then outputs to the host controller the track 0 signal and seek complete signal. Further, the main controller 5 gives a movement amount and offset correction amount to the driver 6 and receives a VO signal from the driver 6 and a peak hold signal from the read portion 7. The driver 6 forms a position control loop with the loop of the encoder 3b, track cross pulse generator 63, and difference counter 57 and a speed control loop with the loop of the encoder 3b, speed generator 62, and speed error detector 61 to perform positioning control of the VCM 3a to the target track and perform positioning correction control, including offset correction, by the output of the adder 65 after the speed of the VCM 3a becomes zero. The read portion 7 gives to the main controller 5 a peak hold signal for the offset measurement and outputs to the host controller the data pulse 2 as read data.

The main controller 5 executes the initialization processing, explained in the following section (c), when the power is turned on, and finds in advance the offset correction amounts for each zone of the magnetic disk. The controller 5 then allows receipt of commands from the host controller, executes the access processing explained in section (d), accesses the data track of the magnetic disk, and performs the read/write operation. Along with this, it corrects the offset correction amount periodically and thus enables offset correction in accordance with the fluctuations in offset due to temperature changes.

(c) Explanation of Initialization Processing

Figure 7A:
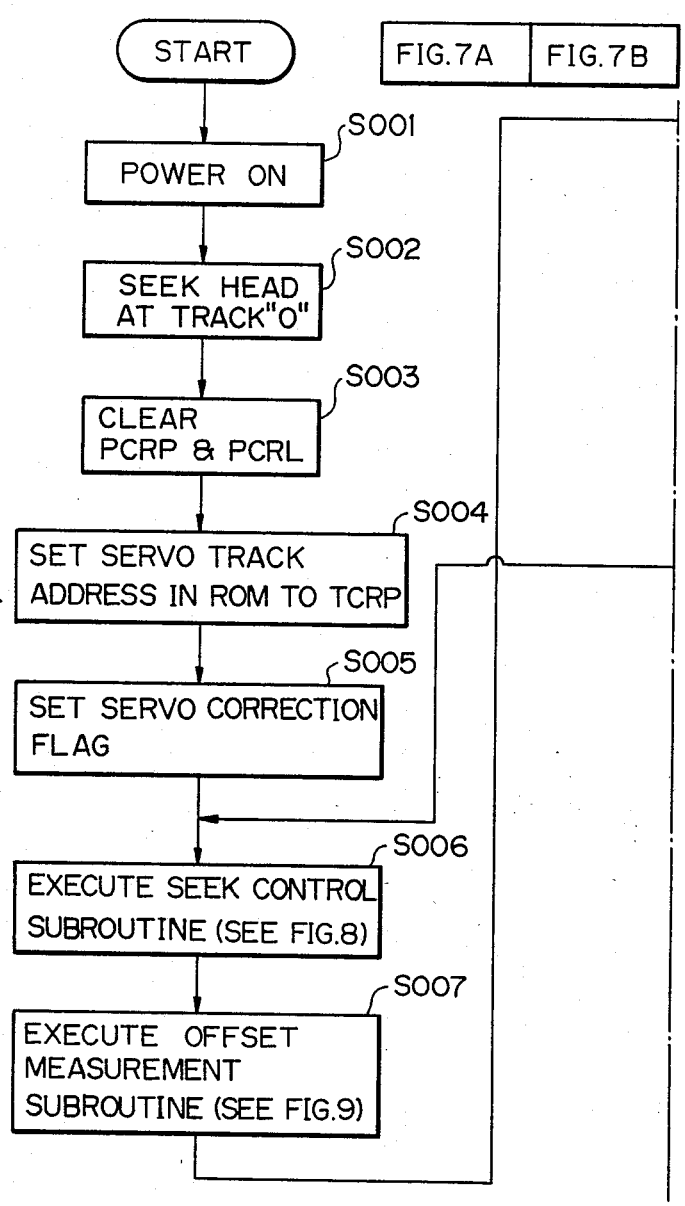
FIGS. 7A and 7B are flow charts of the initialization processing in the control means shown in FIGS. 6A and 6B.
Figure 7B:
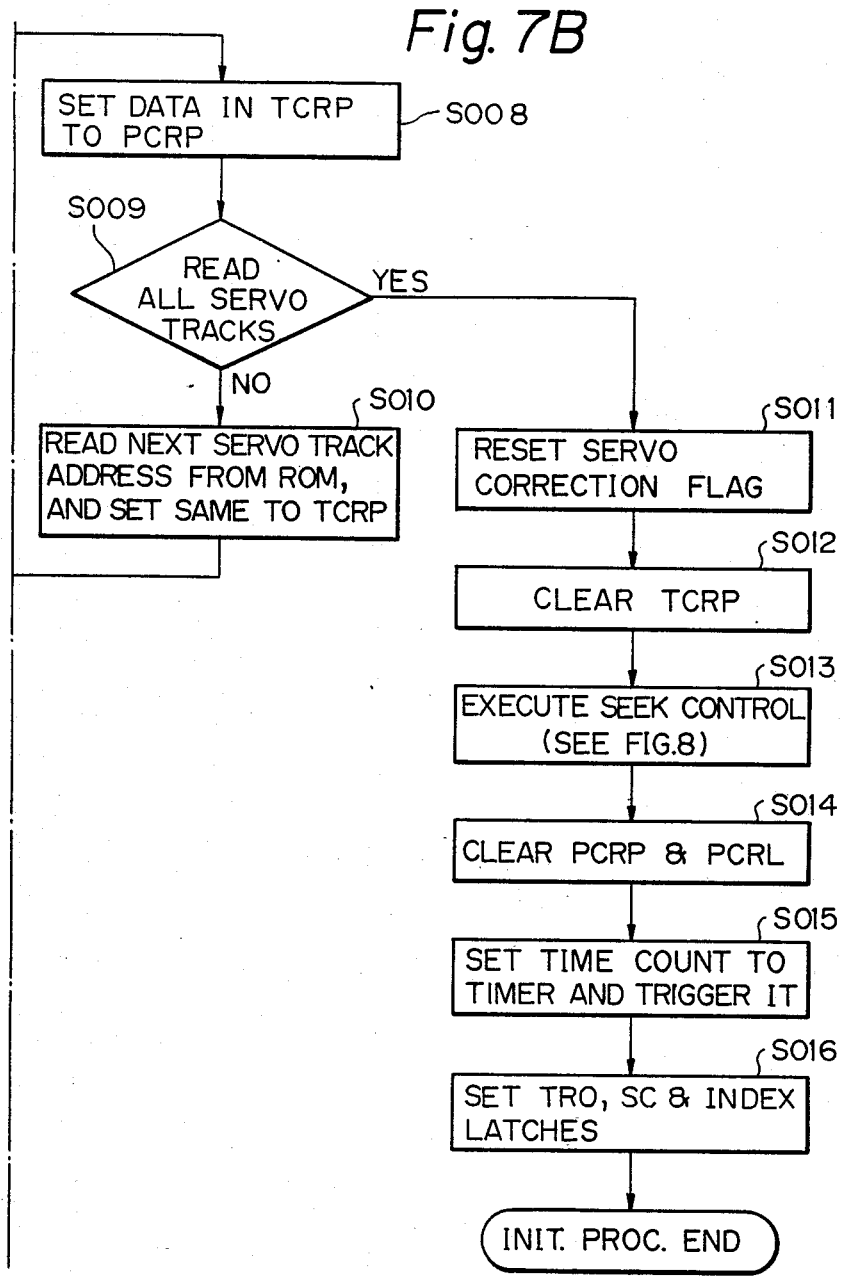
Figure 8A:
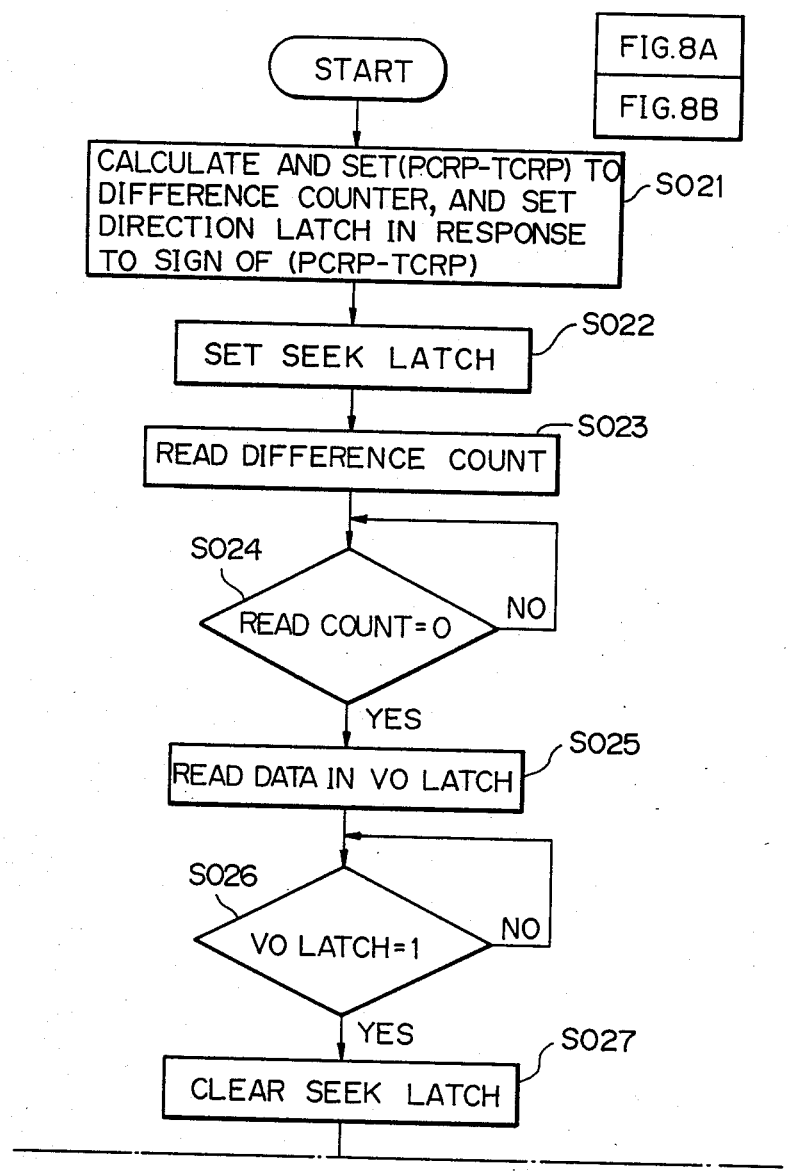
FIGS. 8A and 8B are flow charts of a seek control subroutine in the control means shown in FIGS. 6A and 6B.
Figure 8B:
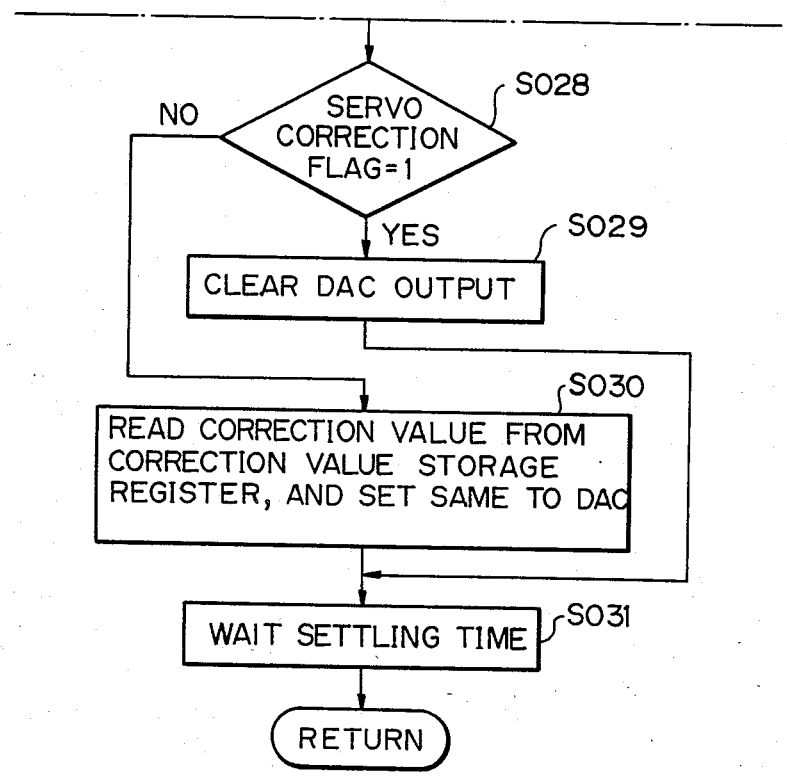
Figure 9:
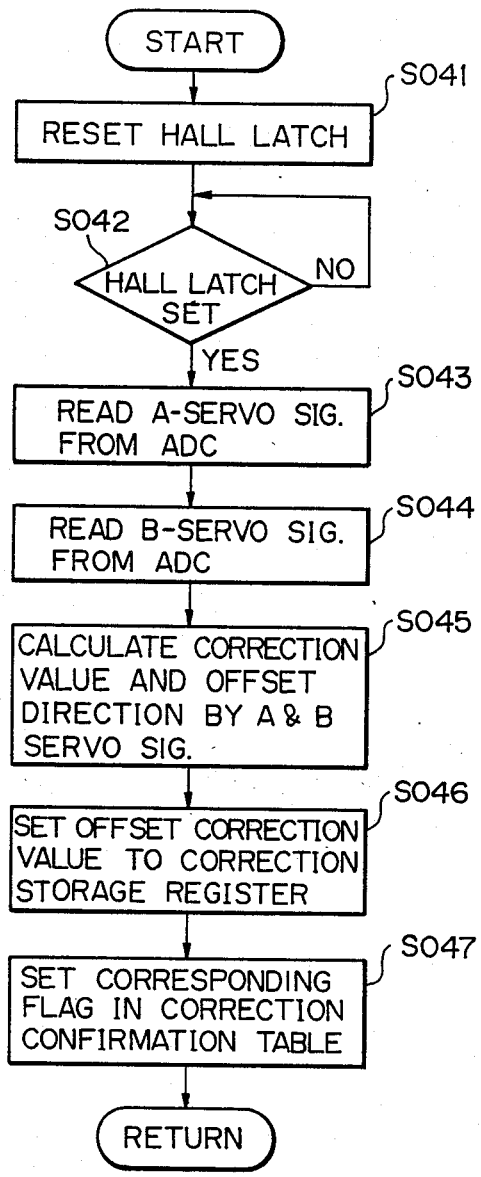
FIG. 9 is a flow chart of an offset measurement subroutine in the control means shown in FIGS. 6A and 6B.

FIGS. 7A and 7B are flow charts of the initialization processing, FIGS. 8A and 8B are explanatory views of a seek control subroutine, and FIG. 9 is an explanatory view of an offset measurement subroutine.

FIG. 7A: Operation of Steps 001 to 003 (S001 to S003)

When the MPU 52 receives a power on signal (S001), the MPU 52 performs seek control for the magnetic heads 2a to 2h to the position of track "0" (S002). While not clearly shown in the structure of FIG. 6, an outer guard bunker is provided at the outside of the track "0" of FIG. 4b. The VCM 3a is driven by the driver 6 via the difference counter 57 so that the magnetic head 2e moves in the outside direction of the magnetic disk. When the magnetic head 2e detects the outer guard bunker, VCM 3a stops and VCM 3a is similarly driven to the inside track "0" to position the magnetic head 2e.

In this way, after positioning at the reference position of the track "0", the MPU 52 sets the present address registers, i.e., PCRP 56c and PCRL 56d, to "0" (S003).

Operation of Steps 004 to 005

Next, the MPU 52 reads the servo track address of the zone 1 of the ROM 54, in FIG. 4c, the physical address "50", uses this as the target track address, and sets it in the TCRP 56a in the RAM 56 (S004), and sets the servo correction flag in the built-in register (S005).

Operation of Step 006

The seek control subroutine, which is explained later with reference to FIGS. 8A and 8B, is then executed and the magnetic head 2e set to the target track (servo track).

Operation of Step 007

Next, the MPU 52 executes the offset measurement subroutine, explained later using FIG. 9, to measure the offset from the read output of the servo track and calculate the correction amount.

Operation of Step 008

Next, the MPU 52 sets the target physical address of the TCRP 56a in the PCRP 56c as the present physical address.

Operation of Steps 009 to 010

The MPU 52 determines from the content of the built-in sequence register if all the servo tracks have been read and if not read, reads the servo track address of the next zone from the ROM 54, sets it in the TCRP 56a, and returns to step 6 (S006).

Operation of Steps 011 to 013

When the MPU 52 reads all the servo tracks and finishes setting the offset correction amounts of all the zones, four zones in FIG. 4c, in the correction storage register 56e, it resets the servo correction flag (S011), sets the physical address 0 in the TCRP 56a (S012), and executes the seek control subroutine of FIGS. 8A and 8B. By this, the magnetic head 2e is positioned at the track "0".

Operation of Steps 014 to 015

The MPU 52 next sets the present address registers, i.e., PCRP 56c and PCRL 56d, to "0" (S014), loads the value in the timer 55, and actuates the timer 55 (S015). The actuation of the timer is to enable automatic updating of the offset when the time runs out.

Operation of Step 016

Next, the MPU 52 sets the TRO latch 59d, SC latch 59e, and index latch 59f of the output register 59, raises the track 0 signal and seek complete signal to the host controller, and makes notification of the ability to receive a command.

FIGS. 8A and 8B will be used to explain the seek control. The seek control is for moving the magnetic head 2e to the desired track. This is used in common for the seek of the data track, explained in the access processing of FIG. 10, and the seek of the servo track, in addition to the seek of the servo track illustrated in FIG. 7.

FIG. 8A: Operation of Steps 021 to 022

The MPU 52 calculates the difference between the target physical address of the TCRP 56a of the RAM 56 and the present physical address of the PCRP 56c, sets this as the movement amount in the difference counter 57, and sets the direction in the direction latch 59a of the output register 59 (S021). Further, it sets the seek latch 59b of the output register 59 (S022).

By this, the multiplexer 66 selects and outputs the error $\Delta V$ of the speed error detector 61 in the VCM driver 67. As mentioned above, the target speed generator 60 issues a target speed Vr according to the direction of the direction latch 59a in accordance with the content of the difference counter 57, while the speed error detector 61 outputs the speed error $\Delta$ between the actual speed Va of the speed generator 62 and the target speed Vr, and drives the VCM 3a through the multiplexer 66 by the VCM driver 67. By the driving of the VCM 3a, the track cross pulse S63 is output from the track cross pulse generator 63 and the difference counter 57 is decremented. By this, the position control and speed control are performed and the magnetic head 2d is made to approach the target physical track address by the VCM 3a.

Operation of Steps 023 to 026

On the other hand, the MPU 52 reads the content of the difference counter 57 (S023) to check if the content of the counter 57 has reached zero, i.e., the target physical address (S024). If the content of the counter 57 has reached zero, it is considered that the target physical address has been reached and then investigation is made of the content of the VO latch 51b of the input register 51 (S025). As mentioned above, the VO detector 64 issues a VO signal when it detects that the actual speed Va has reached zero, so the VO signal is latched in the VO latch 51b. When the VO latch becomes "1" (S026), it is judged that the speed of the VCM 3a is zero and the positioning control is started.

Operation of Step 027

The MPU 52 first clears the seek latch 59b of the output register 59. This switches the multiplexer 66 to select and output the output signal of the adder 65 side.

Operation of Steps 028 to 031

Next, the MPU 52 investigates if the servo correction flag of the built-in register for processing at S005 or S011 of FIG. 7 (S028). If the servo correction flag is up, the offset is being measured, so the MPU 52 sets "0" in the DAC 58a.

Conversely, if the servo correction flag is not up, the MPU 52 reads the offset correction amount of the zone to which the target physical track address of the TCRP 56a belongs and sets it in the DAC 58a so as to perform offset correction by the usual access (S030). By this, a combination of the output of the DAC 58a and the positional signal of the encoder 3b is given from the adder 65 through the multiplexer 66 to the VCM driver 67 and the VCM 3a is subjected to fine control. In this case, in a usual access, the offset correction is performed by the offset correction amount.

Operation of Step 031

After this, the MPU 52 waits for the predetermined settling time (S031) and ends the routine.

Referring to FIG. 9, the offset measurement will now be explained. This operation is one in which the servo signal of the servo track is read so as to measure the offset amount. This is used for the initialization processing of FIGS. 7A and 7B and the offset correction measurement processing of FIGS. 12A and 12B.

FIG. 9: Operation of Steps 041 to 042

The MPU 52 resets the Hall latch 51c of the input register 51 (S041).

As explained with reference to FIG. 5a, the Hall signal is output by the rotation of the spindle motor 11 in synchronization with the position of the positioning signal of the servo track. Therefore, after resetting of the latch 51c, the MPU 52 investigates if the Hall latch 51c is set (S042) by again generating the Hall signal.

Operation of Steps 042 to 043

If the Hall latch 51c is set, the magnetic head 2e is reading the positioning signal of the servo track, so the MPU 52 successively reads through the ADC 58b the region A servo signal and region B servo signal, which comprise the output of the magnetic head 2e held at its peak by the peak hold circuit 70 (S042 and S043).

Operation of Step 044

Next, the MPU 52, as explained in reference to FIGS. 5d to 5f, calculates from the peak held signal A and signal B the offset correction amount Ci (where i is a zone) and the offset direction (S044).

Operation of Steps 045 to 046

Further, the MPU 52 reads the offset correction amount Ci of the correction storage register 56e, corresponding to the zone to which the servo track belongs, sets the flag corresponding to the correction confirmation table 56f, and ends the routine.

(d) Explanation of Access Processing

Figure 10A:
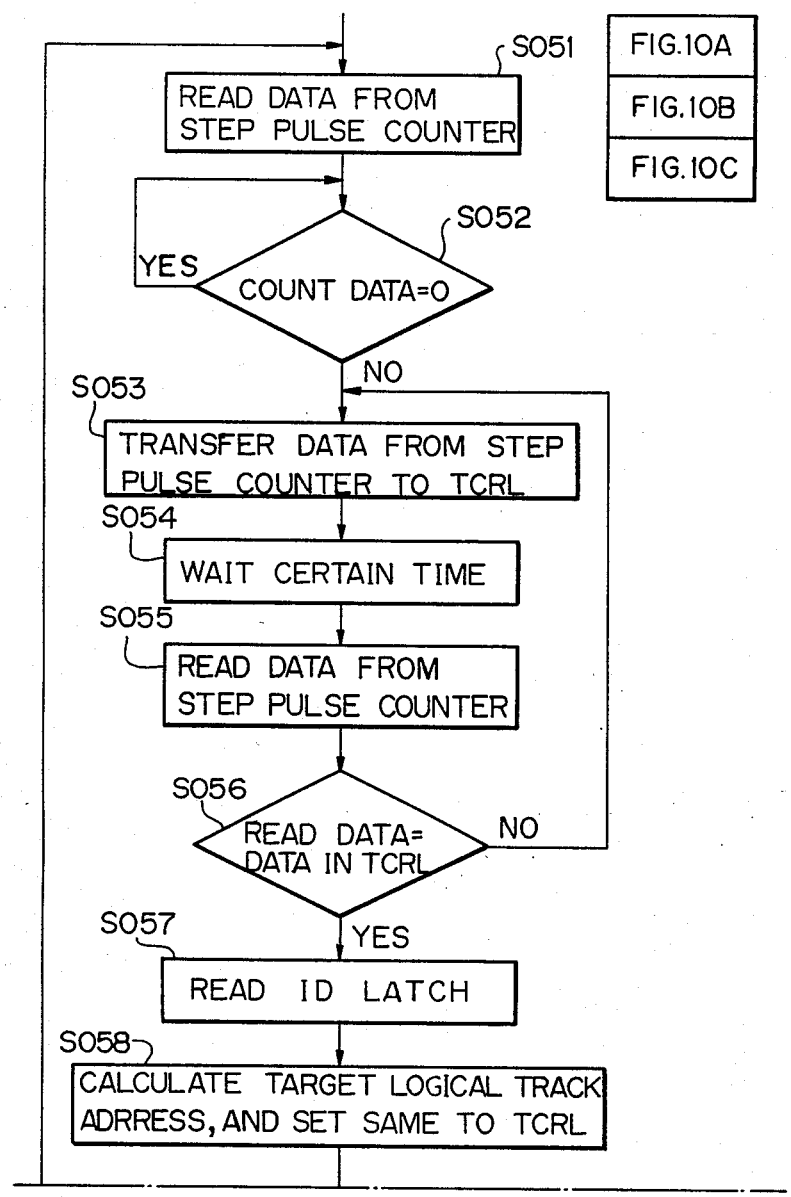
FIGS. 10A to 10C are flow charts of the access processing of the control means shown in FIGS. 6A and 6B.
Figure 10B:
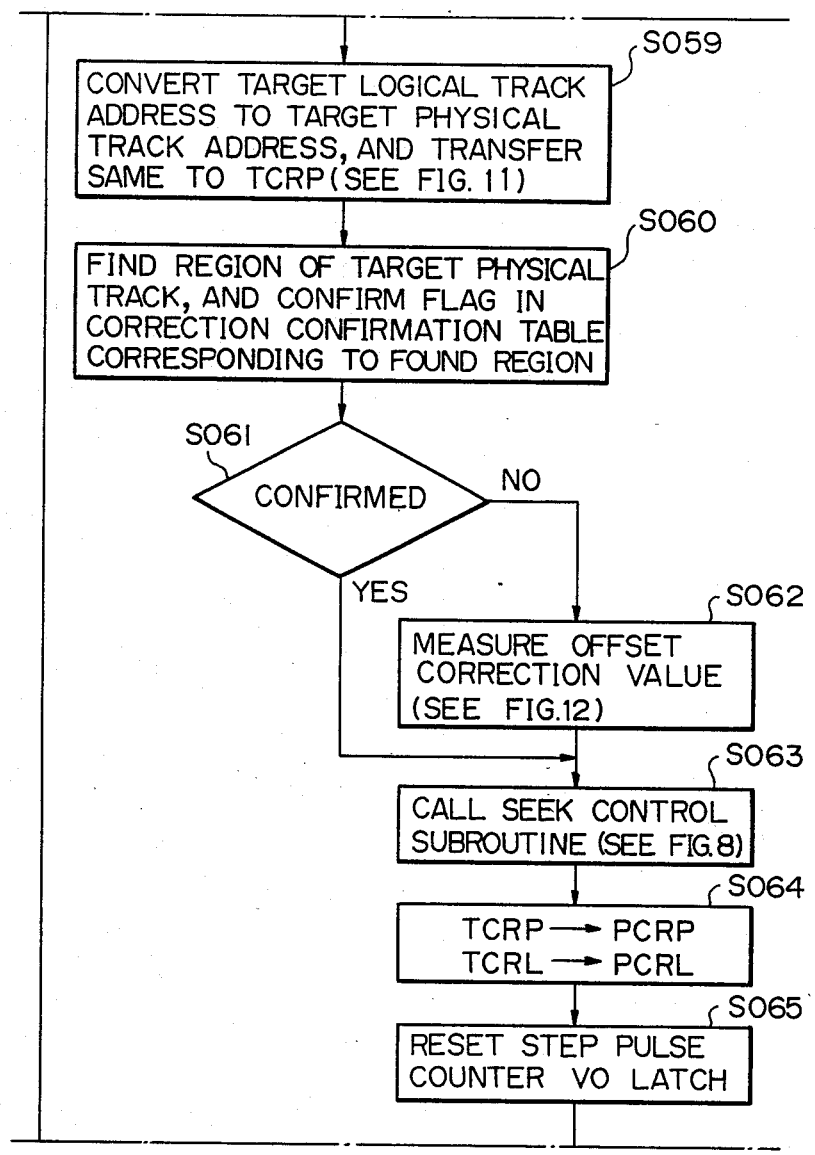
Figure 10C:
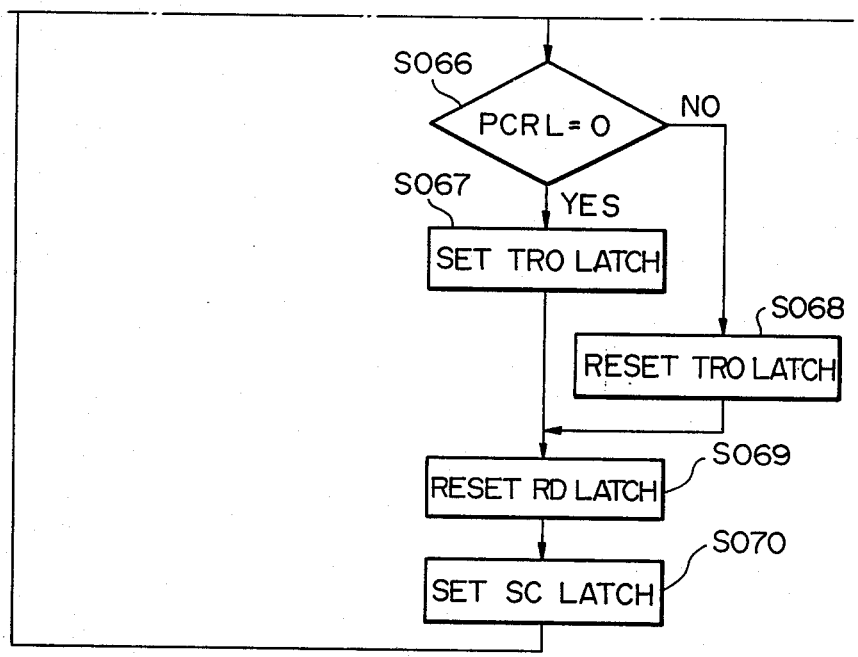
Figure 11:
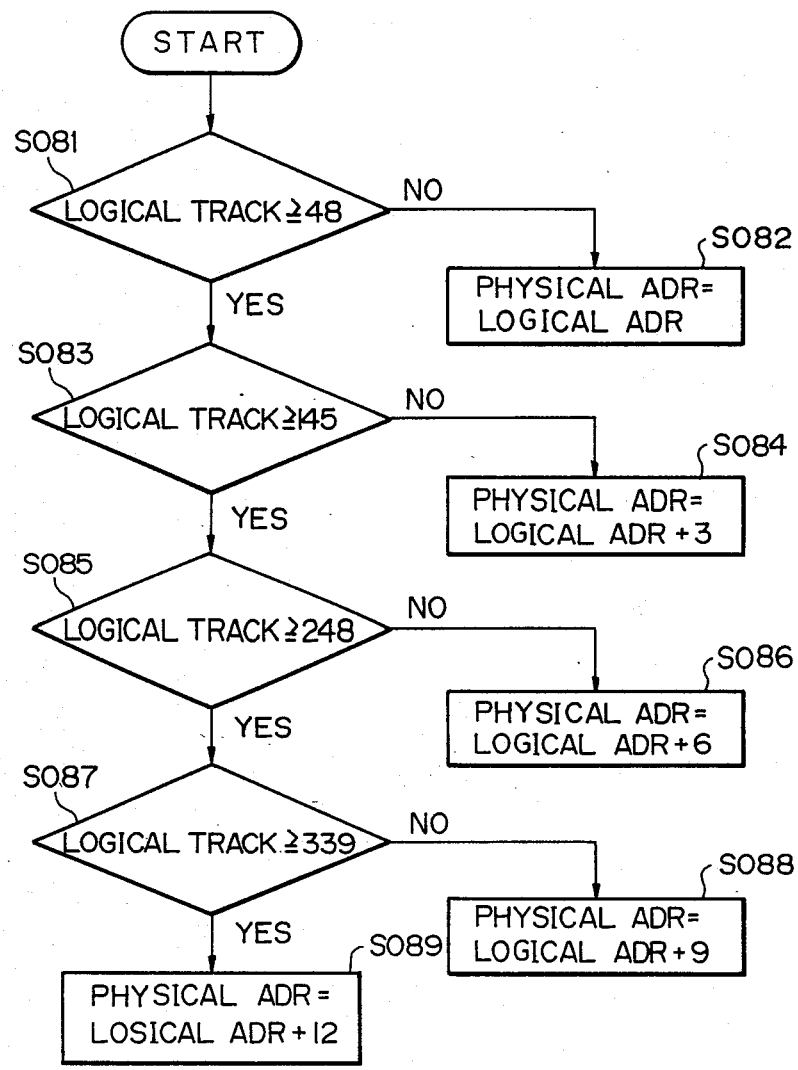
FIG. 11 is a flow chart of the logical address/physical address conversion processing in FIGS. 10A to 10C.
Figure 12A:
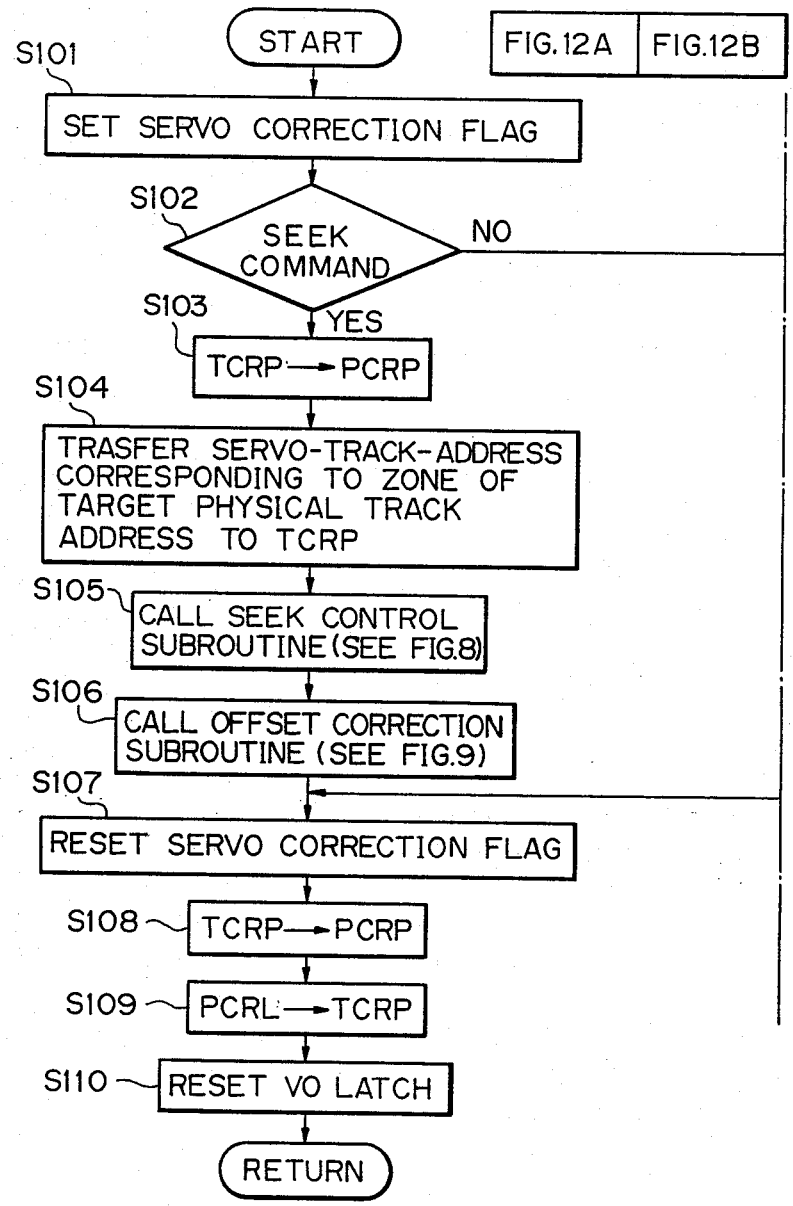
FIGS. 12A and 12B are flow charts of the offset correction measurement processing in FIGS. 10A to 10C.
Figure 12B:
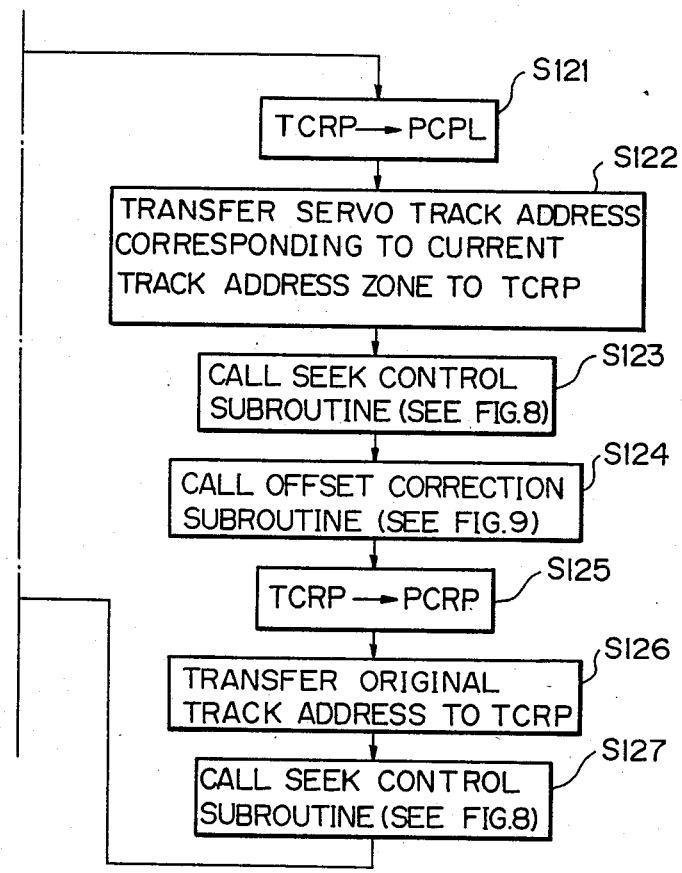

FIGS. 10A to 10C are flow charts of the access processing, FIG. 11 is a flow chart of the logical address/physical address conversion processing, and FIGS. 12A and 12B are flow charts of the offset correction measurement processing.

FIG. 10A: Operation of Steps 051 to 052

The MPU 52 reads the content of the step pulse counter 50 (S051) to investigate if the content of the counter 50 is zero or not (S052). As mentioned above, since a relative logical address is given from the host controller as a seek command in the form of a number of step pulses, the fact that the counter 50 is at zero means that a seek command is being awaited.

Operation of Steps 053 to 056

On the other hand, if the count in the counter 50 is not zero, the step pulse and direction are being given from the host controller as a seek command, so the MPU 52 moves the content of the step pulse counter 50 to the TCRL 56b, the target logical track address register of the RAM 56 (S053). The MPU 52 then waits for a predetermined time (S054) and again reads the content of the step pulse counter 50 (S055) and compares it with the afore-mentioned read content of the TCRL 56b. If not the same, the step pulse is continued to be output from the host controller and is not the final command value, so the TCRL 56b is updated to the read content and this step is repeated.

Operation of Steps 056 to 059

The MPU 52, when it judges that the read content is the same as the read connect to the previous time of the TCRL 56b (S056), judges that the step pulses are completed, reads out the ID latch 51a of the input register 51, and obtains the designated direction of movement of the magnetic disk. Then, the MPU 52 calculates the target logical track address in accordance with the designated direction from the logical relative address of the TCRL 56b and the present logical address of the TCRL 56d and sets the same in the TCRL 56b (S058).

Next, the MPU 52, based on the relation illustrated in FIG. 4c, converts the target logical track address into a target physical address by the processing shown in FIG. 11 and moves the same to the TCRP 56a. As shown in FIG. 4c, when there are three servo tracks set for each zone of 100 tracks, conversion is made to the target physical track address as follows: If the target logical track address is 48 or less, it is considered that the physical track address equals the logical track address (S081 and S082). If the target logical track address is between 49 and 145, it is considered that the physical track address equals the logical track address +3 (S083 and S084). If the target logical track address is between 146 and 248, it is considered that the physical track address equals the logical track address +6 (S085 and S086). If the target logical track address is between 249 and 339, it is considered that the physical track address equals the logical track address +9 (S087 and S088). If the target logical track address is 340 or more, it is considered that the physical track address equals the logical track address +12 (S089). By this conversion, the host controller can perform accessing with the logical track address of just the data track without having to account for the existence of the servo tracks.

FIG. 10B: Operation of Steps 060 to 061

The MPU 52 seeks the zone corresponding to the target physical track address of the TCRP 56a and confirms the flag corresponding to the zone of the correction confirmation table 56f of the RAM 56 (S060). The confirmation of the flag, as explained in FIGS. 12A and 12B, is made in that, after the elapse of time by the timer 55, to update the offset correction amount, the flag of the correction confirmation table 56f is set and until the update of the offset correction amount, the offset correction amount of the correction storage register 56e is made invalid. The flag of the correction confirmation table 56f is confirmed (S061) and, if the flag is up, the offset correction amount of the correction storage register 56e is valid and the control proceeds to step S063. If the flag is being reset, the offset correction amount is considered invalid and the control passes through step S062 and the rest of the offset correction measurement processing (FIGS. 12A and 12B) routine before proceeding on to step S063.

Operation of Step 062

Referring to FIGS. 12A and 12B, an explanation will now be made of the measurement of the offset correction amount.

FIG. 12A: Operation of Step 101

First, the MPU 52 sets the servo correction flag in the built-in register.

Operation of Step 102

Next, the MPU 52 investigates if the host controller has an error retry function (S102). If the host controller has an error retry function, the processing of steps 103 to 110 is executed. If it does not, steps 121 on are executed. The same applies even where the position of the magnetic head does not change.

Operation of Steps 103 to 110

The MPU 56 moves the target physical track address from the target physical track address register TCRP 56a to the present logical track address register PCRL 56d (S103).

Next, the MPU 52 reads out from the ROM 54 the servo track address belonging to the zone of the target physical track address and moves it to the target physical track address register TCRP 56a (S104). The MPU 52 executes the seek control subroutine of FIGS. 8A and 8B, positions the magnetic head 2e at the servo track (S105), executes the offset correction subroutine of FIG. 9, finds the offset correction amount of the zone, stores the correction amount in the correction storage register 56e, and sets the flag of the zone of the correction confirmation table 56f (S106).

Next, the MPU 52 resets the servo correction flag (S107), moves the target servo track address of the TCRP 56a to the PCRP 56c, returns to the TCRP 56a the target physical track address which has retracted to the PCRL 56d (S108), and finally resets the VO latch 51b (S110).

Operation of Steps 121 to 127 and 107 to 110

When the host controller does not have an error retry function or when the track address of the magnetic head does not change, the following is performed:

The MPU 52 first, like in step 103, moves the target track address from the target physical track address register TCRP 56a to the present logical track address register PCPL 56d (S121). Next, the MPU 52 reads from the ROM 52 the servo track address belonging to the zone of the present track address and moves it to the target physical track address register (S122). Here, unlike in step 104, the servo track address belonging to the zone of the present track address is read in that, in the case of a host controller not having an error retry function, no target physical track address is output. The MPU 52 executes the seek control subroutine (FIGS. 8A and 8B) and positions the magnetic head 2e to the servo track position (S123). Next, it executes the offset correction subroutine (FIG. 9), finds the offset correction amount for the zone, stores the correction amount in the correction storage register 56a, and sets the flag for the zone in the correction confirmation table 56f (S124).

The MPU 52 has moved the magnetic head from the position recognized by the host controller to the servo track to update the offset correction amount, so once again returns it to the position recognized by the host controller. That is, it moves the target physical track address from the target physical track address register TCRP 56a to the present physical track address register (56c (S125), moves the original track address to the target physical track address register TCRP 56a (S126), and executes a seek control subroutine (FIGS. 8A and 8B) on the same (S127). By this, the magnetic head is returned to the position occupied before the offset correction.

After this, the processing of steps 102 to 110 is performed.

After the above processing (FIG. 10B, S062), the control returns to step 063 of FIG. 10B.

FIG. 10B: Operation of Steps 063 to 064

The MPU 52 executes the seek control subroutine of FIGS. 8A and 8B (S063) based on the target physical track address of the target physical track address register TCRP 56a and the present physical track address of the present physical track address register PCRP 56c and positions the magnetic head 2e at the date track of the target physical track address. The MPU 52 thereby moves the target physical track address of the TCRP 56a to the PCRP 56c as the present physical track address and moves the target logical track address of the TCRL 56b to the present logical track address register PCRL 56d as the present logical track address (S064).

Operation of Steps 065 to 068

Next, the MPU 52 resets the step pulse counter 50 and the VO latch 51b (S065). Further, the MPU 52 investigates based on the content of the present logical address register PCRL 56d if the track is "0" (S066). If the content of the PCRL 56d is 0, it considers that the track is "0", sets the zero track (TRO) LATCH 59D (S067), and gives the track 0 signal to the host controller. If the content of the PCRL 56d is not 0, it considers that the track is not "0" and resets the TRO latch 59d (S068).

Operation of Steps 069 to 070

The MPU 52 resets the RD latch 59c (S069) to enable the data of the data pulse generator 71 to be output from the read portion 7 and sets the SC latch 59e (S070) to raise the seek complete signal to the host controller and notify it of completion of the seek operation, then returns to step 051.

Therefore, the host controller reads out as read data the read pulse from the magnetic head of the data pulse generator 71 through the gate circuit 73, checks the track number of the track, obtains the read data following the same if executing a read command, and writess the data on the track by a write portion, not shown, if executing a write command.

Figure 13:
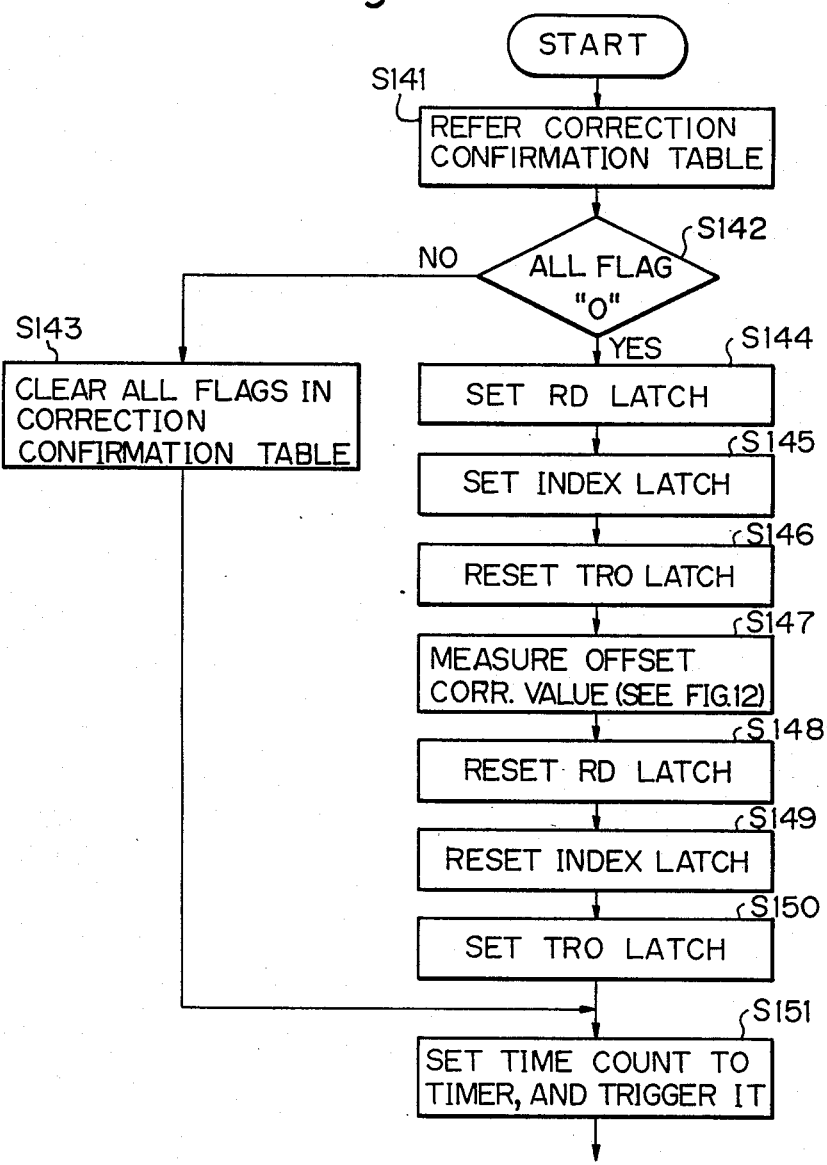
FIG. 13 is a flow chart of an interruption processing routine in FIG. 10.

FIG. 13 is an explanatory view of the interruption processing routine.

The magnetic disk turns when the power is turned on. After an elapse of time, the temperature of the mechanical components gradually rises and reaches a certain temperature. Therefore, the temperature rise causes a change in the amount of deviation in the position of the track of the magnetic disk, necessitating updating of the offset correction amount. Therefore, as mentioned earlier (FIG. 7B, S015), a predetermined time is set, the timer 55 actuated, and when the timer finishes counting the set value, i.e., the time runs out, the MPU 52 is interrupted and the routine for updating the offset correction amount is executed.

FIG. 13: Operation of Steps 141, 142, 143, and 151

When the MPU 52 is interrupted, reference is made to all the flags of the correction confirmation table 56f of the RAM 56 (S141). As mentioned above, a set flag indicates a valid offset correction amount.

If all the flags of the correction confirmation table 56f are not "0" (S142), the MPU 52 considers that all the flags of the correction confirmation table are "0" and invalidates the offset correction amount compulsority (S143). Then, the MPU 52 loads the time value of the offset correction period in the timer 55, actuates the timer 55 (S151), and ends the interruption processing.

Operation of Steps 142 and 144 to 151

On the other hand, if all the flags of the correction confirmation table are "0", the MPU 52 did not accept any seek command during the elapsed period and therefore judges that there was no updata of the offset of FIGS. 10A and 10B during that period. In this case, the MPU 52 sets the latch 59c (S144). By this, the gate circuit 73 enters an inhibit state and the output of the data pulse generator 71 is not transmitted to the host controller. In the same way, the MPU 52 resets the index latch 59f in the output register 59 (S145), whereby the index signal from the comparator 9 is inhibited by the gate circuit 81 of the index transmitter 8 and not transmitted to the host controller. Further, the MPU 52 resets the TRO latch 59d (S146) and drops the track 0 signal to the host controller.

As mentioned above, once the state is entered where requests from the host controller are inhibited, the MPU 52 measures the offset correction amount (S147). The measurement of the offset correction amount was explained earlier with reference to FIG. 12. This enables measurement of the offset correction amount by both a host controller having a read error retry function and a host controller not having one.

When the offset correction amount is updated, an operation is performed to restore the system to the normal state. That is, the MPU 52 resets the RD latch 59c in the output register 59 (S148), resets the index latch 59f (S149), and further sets the TRO latch 59d (S150).

Suitably thereafter, for the next time-out interruption processing, the MPU 52 loads the time value of the offset correction period in the timer 55 once again, actuates the timer 55 (S151), and ends the interruption processing.

FIGS. 14a to 14g and FIGS. 15a to 15h are all timing charts of the access processings.

Figure 14:
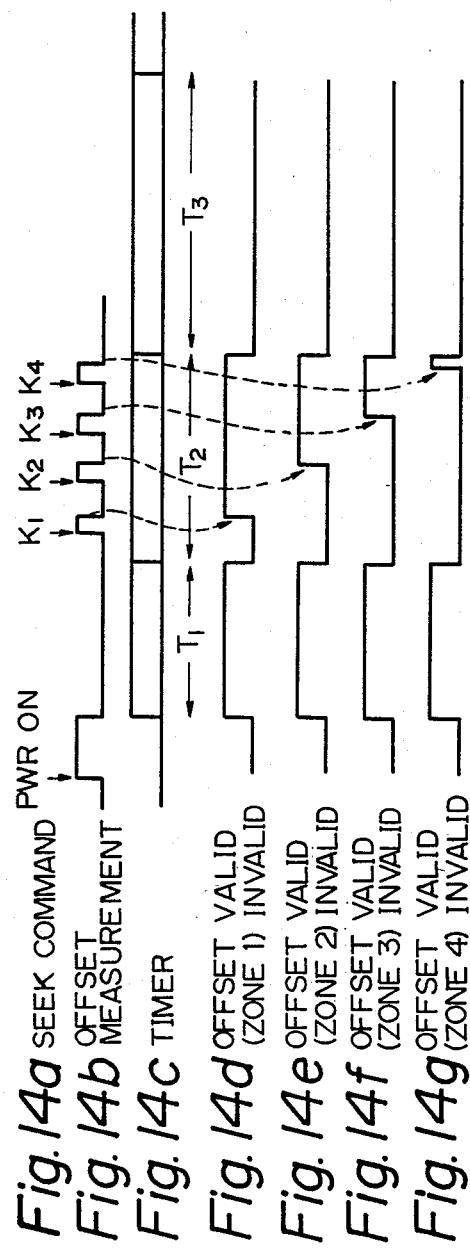
FIGS. 14a to 14g and FIGS. 15a to 15h are timing charts of the overall operation of an embodiment of the present invention.

When the power is turned on, the initialization processing (see FIGS. 7A and 7B) results, as shown in FIG. 14b, in measurement of the offset correction amount for each zone, setting of the offset correction amounts $C_1$ to $C_n$ in the correction storage register 56e, turning on of the flags of the correction confirmation table 56f, and actuation of the timer 55 (FIG. 14c). Therefore, during the period of the load value $T_1$ of the timer 55, the offset corrections of all the zones are valid and accessing is performed by the offset corrections in response to seek commands on the zones.

Next, when the timer 55 runs out and the period $T_1$ ends, the MPU 52 is interrupted. By this interruption of the MPU 52 (see FIG. 13), the offset correction amounts of all the zones are made invalid (FIGS. 14d to 14g). On the other hand, the timer 55 is actuated for the next period $T_2$ (FIG. 14c).

In this state, if a seek command $K_1$ arrives (FIG. 14a), at step S062 of the access processing of FIG. 10B, access is performed by measurement of the offset correction amount for the zone of the track address shown by the seek command, updating of the offset correction amount of the corresponding zone of the correction storage register 56e, turning on of the flag of the corresponding zone of the correction confirmation table 56f, and the updated offset correction.

At this time, updating of offsets is not performed for all zones in response to a single seek command, but offset correction performed for only zone 1, so as not to prolong the access time for the seek command. Only the offset updating required for the accessing of the designated track is performed. Therefore, at the period $T_2$, offset updating is performed only for the corresponding zone of the track designated by the seek command. For example, offset updating is performed only for the first zone in response to a seek command $k_1$ of the first zone, whereby the offset correction becomes valid. The same applies to the seek commands $K_2$, $K_3$, and $K_4$.

On the other hand, as shown in FIGS. 15a to 15h, if no seek command arrives at all during the previous period $T_{n-1}$, no offset updates were performed during that period $T_{n-1}$. Therefore, the magnetic head is at the track accessed at the period $T_{n-1}$ or before and the track would end up accessed by the offset correction amount of at the period $T_{n-1}$ or before.

If a seek command arrives in the period $T_n$, the offset is updated in the same way as in FIGS. 14a to 14c, so there is no problem, but if a read/write command arrives without a seek command, that is, a read/write command for the same address as the present track address, the access processing of FIG. 10 is not performed and just the read/write operation is performed. As to the relation between the head and track at this time, the access is performed by the offset correction amount of the period $T_{n-1}$ or before, so there is a possibility of deviation at the period $T_n$ and, therefore, a correct read/write operation cannot be ensured.

Further, if the host controller does not have retry function for a read error, even if the read error is output, no seek command will arrive and there will be no change for offset correction.

Figure 15:
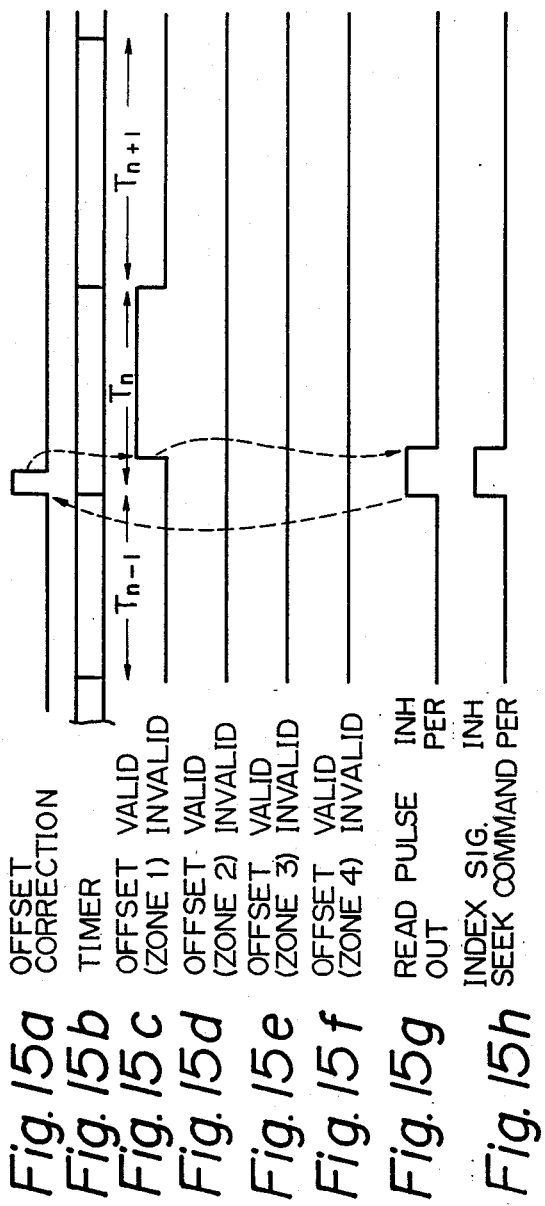

Therefore, if no seek command arrives at the period $T_{n-1}$ and all the flags of the correction confirmation table 56f are zero (FIG. 13, S142), the RD latch 59c and the index latch 59f of the output register 59 are set (S144 and S145) and the output of the data pulse generator 71 inhibited by the gate circuit 73 and the output of the index signal is inhibited by the gate circuit 81 (FIGS. 15g and 15h). Further, the TRO latch 59d is reset (S146) and measurement of the offset correction amount is performed autonomously (FIG. 13, S147 and FIG. 15a). When the offset correction value is measured, the correction table 56e written into, and the update completed, the RD latch 59c and the index latch 59f are reset (FIG. 13, S148 and S149), the output of the data pulse generator 71 made able to be transmitted from the gate circuit 73 to the host controller (FIG. 15g), and the index signal made able to be transmitted from the gate circuit 81 to the host controller (FIG. 15h). Next, the timer 55 is again loaded with the time and the next offset correction interruption is set.

After this, access to the track address becomes possible by the above corrected offset.

Figure 16:
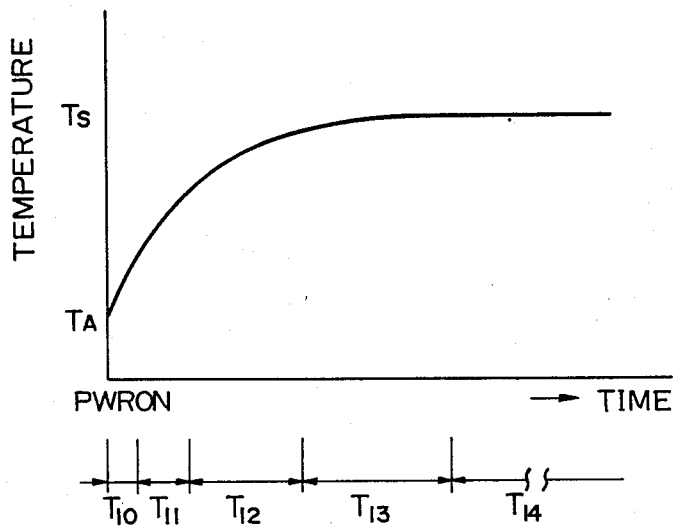
FIG. 16 is a graph of the temperature rise characteristics of another embodiment of the present invention.

The offset changes, primarily along with rises in temperature of the magnetic disk apparatus. The temperature, as shown in FIG. 16, changes from the atmospheric temperature $T_A$ at the time of the power being turned on to the saturation temperature $T_S$. Considered from a fixed unit of temperature rise, the interval of this change becomes successively longer, i.e., $T_{10}, T_{11}, \ldots$ 14. Therefore, the period loaded in the timer 55 may be made gradually longer as $T_1, T_2 \ldots$. This enables reduction of the frequency of the autonomous offset corrections by the interruptions under steadystate operation.

Figure 17A:
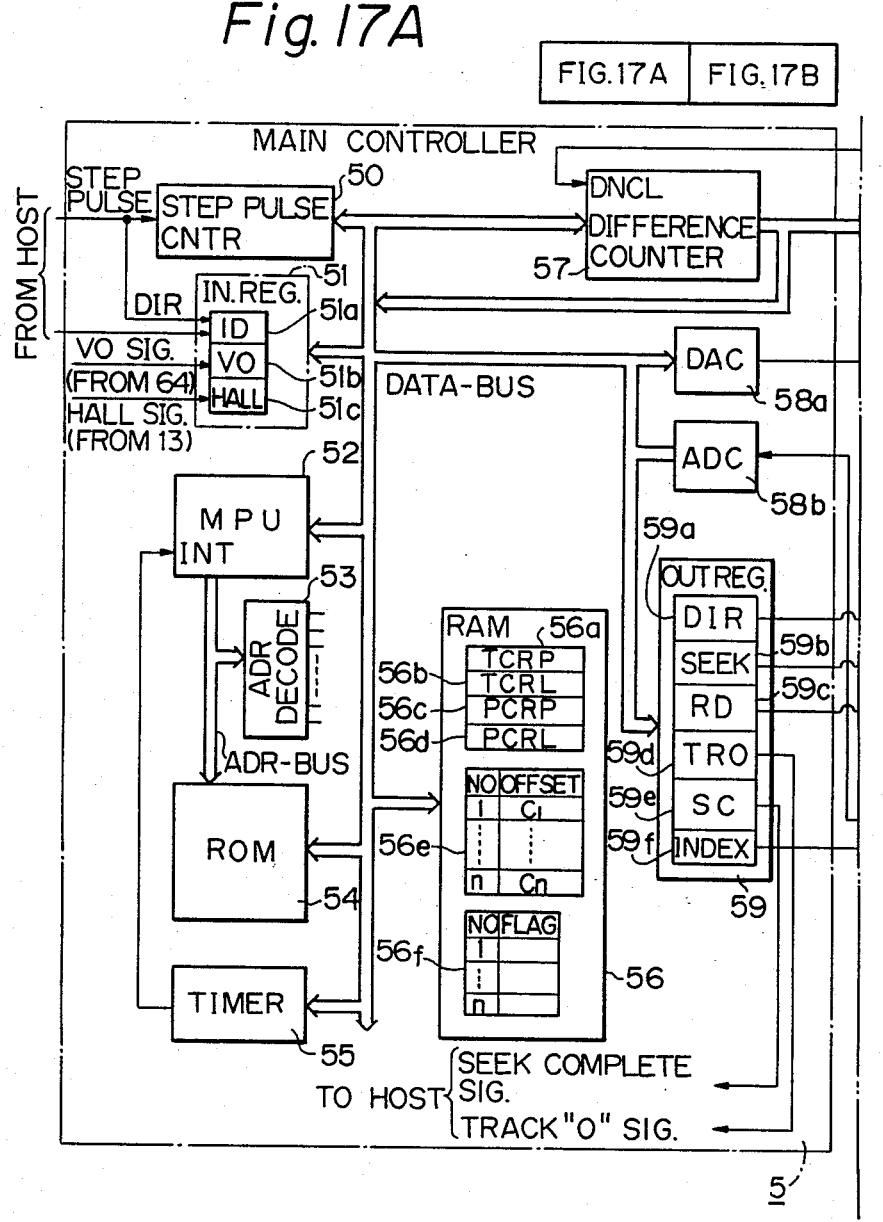
FIGS. 17A and 17B are structural views of still another embodiment of another control means in accordance with the present invention.
Figure 17B:
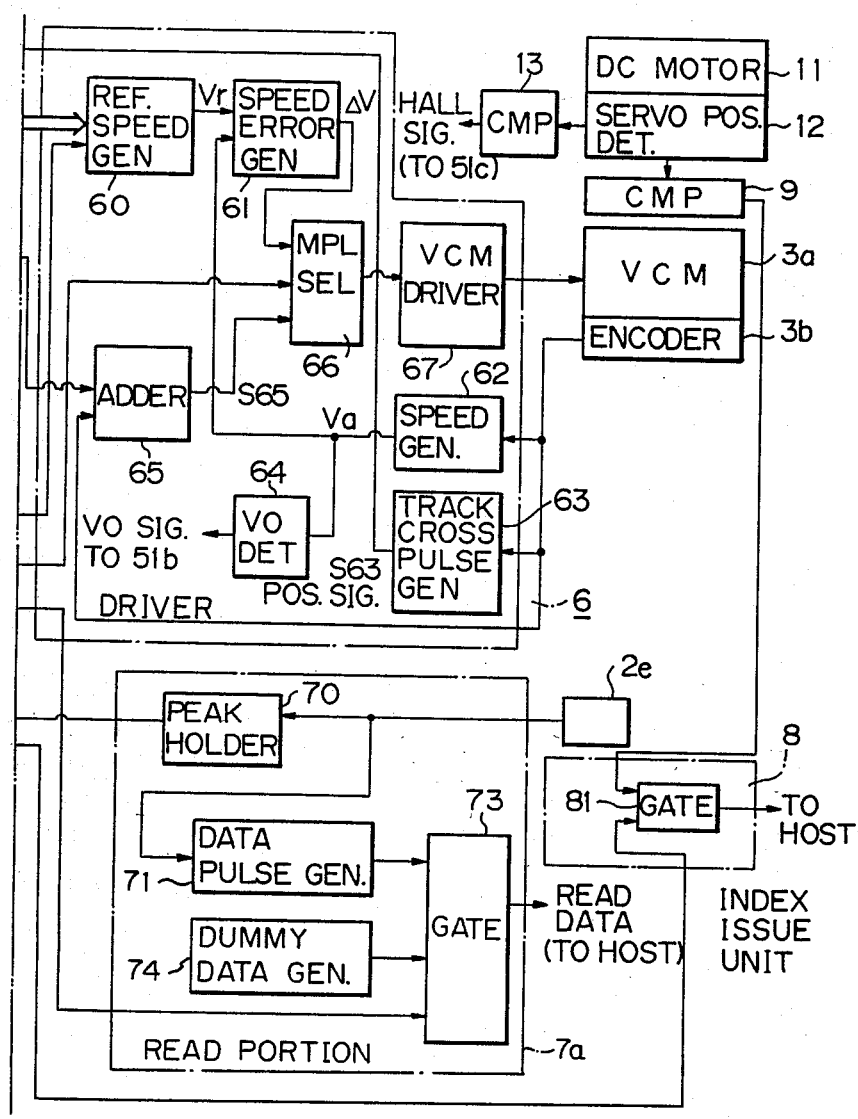

FIGS. 17A and 17B show still another embodiment of the control means in accordance with the present invention.

In the figures, a read portion 7a is provided with a dummy (or illegal) data generation circuit 74 in addition to the circuits of the read portion 7 shown in FIGS. 6A and 6B. When the control means 4 carries out the automatic offset correction, a gate circuit 73a inhibits an output of the index signal from the index register 59f, but permits an output of data from the dummy data generation circuit 74. The dummy data generated at the dummy data generation circuit 74 has a special pattern, for example, "101010 . . . 1010".

The host controller having a read retry function receives the dummy read data, and retries the issue of the seek command. Note that, since the index signal is not output from the disk control apparatus, the time update in the host controller is not effected, and thus a time over does not occur.

The temperature compensation of FIG. 16 can be also applied to the disk control apparatus shown in FIGS. 17A and 17B.

In the above described embodiment, a relative logical address of the seek command from the host controller was given as pulses, but an absolute logical address may also be given.

While the present invention was explained in reference to an embodiment, the present invention includes various modifications within the scope of the invention. These are not excluded from the invention.

As mentioned above, according to the present invention, the host controller can issue commands without having to concern itself with offset update operations of the disk apparatus. Further, the present invention, without making any modifications on the existing host controller, enables inhibition of the read output and index output and automatic offset update when no offset update is performed for a predetermined time. By this, the magnetic disk apparatus of the present invention enables precise positioning, through effective offset correction, even with higher densities. Further, the magnetic disk apparatus of the present invention can be connected to a host controller regardless of the type of disk controller without any modification of the disk controller.

Still further, the magnetic disk apparatus of the present invention enables offset correction at the timing where the offset should be corrected, so it is possible to reduce to a minimum interruption of actual accesses due to offset corrections under steady-state operation.

Many widely different embodiments of the present invention may be constructed without departing from the spirit and scope of the present invention, and it should be understood that the present invention is not restricted to the specific embodiments described above, except as defined in the appended claims.

We claim:

1. A track access control system for a magnetic disk apparatus including a rotatable magnetic disk provided with fine positioning information within tracks, a magnetic head, moving means for moving the magnetic head in a direction so as to traverse the track, and control means for controlling the moving means to move the magnetic head to a desired track on the magnetic disk in response to a seek command from a host controller and by using a valid offset correction value which is previously obtained by accessing the magnetic head at a track storing the fine positioning information, and carrying out an offset correction,
    timer means for measuring a time for offset-updating within a predetermined time;
    means for storing an offset correction value having a valid state and an invalid state;
    means for making the state of said offset correction value invalid in response to said timer means timing out;
    first offset correction means for performing an offset correction in response to receiving a seek command when said offset correction value has an invalid state, and for executing the received seek command;
    means for providing an index signal;
    means for inhibiting said index signal upon expiration of said predetermined time;
    second offset correction means for performing an offset correction in response to a seek command not being received within said predetermined time, and thereafter, enabling said index signal; and
    setting means for setting said timer means to said predetermined time for updating the offset correction.

2. A track access control system according to claim 1, further comprising:
    means for providing read data;
    means for inhibiting output of said read data to said host controller when said index signal is inhibited.

3. A track access control system according to claim 1, further comprising:
    means for generating dummy data; and
    means for providing said dummy data from said dummy data generation means to said host controller when said index signal is inhibited.

4. A track access control system according to claim 2, wherein said setting means sets a time defined as a duration wherein a predetermined offset is produced at said timer as said offset update time.

5. A track access control system according to claim 3, wherein said setting means sets a time defined as a duration wherein a predetermined offset is produced at said timer as said offset update time.

6. A track access control system according to claim 1, wherein said first offset correction means includes means for causing the host controller to issue the seek command in response to the offset correction value having an invalid state.

7. A track access control system according to claim 6, wherein said second offset correction means includes means for causing the host controller to issue the seek command in response to the offset correction value having an invalid state.

8. A track access control system connectable to a host system, for accessing tracks including information on a disk, said system comprising:
    means for receiving a seek command from the host controller and for providing index and data signals to the host controller;
    memory means for storing offset correction values each having a valid and invalid state;
    generation means for generating an offset correction value based on the information of at least one of the tracks;
    timer means for measuring a predetermined time;
    first offset correction means for causing, in response to at least said timer means measuring said predetermined time, said generation means to generate an offset correction value, for storing the generated offset correction value in said memory means and for setting the state of said stored offset correction value to valid; and
    means for inhibiting said index signal and said data signal in response to said timer means measuring said predetermined time.

9. A track access control system according to claim 8, wherein said first offset correcting means includes means for causing the host controller to issue a seek command after said timer means measures said predetermined time, and wherein said first offset correcting means is responsive to the seek command.

10. A method of accessing disk tracks including information, said method comprising:
    generating an offset correction value based on the information, said offset having a valid state and an invalid state;
    measuring a predetermined time after which said offset correction value state is made invalid;
    providing index and data signals responsive to the information during the predetermined time;
    receiving a seek command;
    determining if a seek command was received during the predetermined time;
    inhibiting said index and data signals, initiating said generation of an offset correction value and restarting the measurement of the predetermined time if a seek command has not been received during the predetermined time.

* * * * *